(12) United States Patent
Brown et al.

(10) Patent No.: US 7,580,898 B2
(45) Date of Patent: Aug. 25, 2009

(54) FINANCIAL TRANSACTIONS WITH DYNAMIC PERSONAL ACCOUNT NUMBERS

(75) Inventors: Kerry D. Brown, Portola Valley, CA (US); David Kevin Pariseau, Los Altos, CA (US)

(73) Assignee: Qsecure, Inc., Los Altos, CA (US)

( * ) Notice: Subject to any disclaimer, the term of this patent is extended or adjusted under 35 U.S.C. 154(b) by 383 days.

(21) Appl. No.: 11/618,813

(22) Filed: Dec. 30, 2006

(65) Prior Publication Data

US 2007/0208671 A1 Sep. 6, 2007

Related U.S. Application Data

(63) Continuation-in-part of application No. 11/404,660, filed on Apr. 14, 2006, now Pat. No. 7,543,739, and a continuation-in-part of application No. 11/297,014, filed on Dec. 8, 2005, now Pat. No. 7,472,829, and a continuation-in-part of application No. 10/800,821, filed on Mar. 15, 2004.

(60) Provisional application No. 60/764,944, filed on Feb. 3, 2006.

(51) Int. Cl.
*G06F 17/60* (2006.01)
(52) U.S. Cl. .............................. 705/75; 705/50; 705/51
(58) Field of Classification Search .................... 705/75, 705/50, 51
See application file for complete search history.

(56) References Cited

U.S. PATENT DOCUMENTS 4,529,870 A * 7/1985 Chaum ........................ 235/380

FOREIGN PATENT DOCUMENTS

JP 2006344204 A * 12/2006

* cited by examiner

*Primary Examiner*—Pierre E Elisca
(74) *Attorney, Agent, or Firm*—Richard B. Main

(57) ABSTRACT

A method for securing financial transactions involving payment cards includes associating a sixteen-digit personal account number (PAN) with a particular payment card and user, wherein are included fields for a system number, a bank/product number, a user account number, and a check digit. A four-digit expiration date (MMYY) associated with the PAN. A magnetic stripe on the payment card is encoded with the PAN for periodic reading by a magnetic card reader during a financial transaction. A table of cryptographic values associated with the PAN and the MMYY is stored on each user's payment card during personalization by an issuing bank. A next financial transaction being commenced with the payment card is sensed. A cryptographic value from the table of cryptographic values is selected for inclusion as a dynamic portion of the user account number with the PAN when a next financial transaction is sensed. Any cryptographic value from the table of cryptographic values will not be used again in another financial transaction after being used once. The issuing bank authorizes the next financial transaction only if the PAN includes a correct cryptographic value in the user account number field.

13 Claims, 11 Drawing Sheets

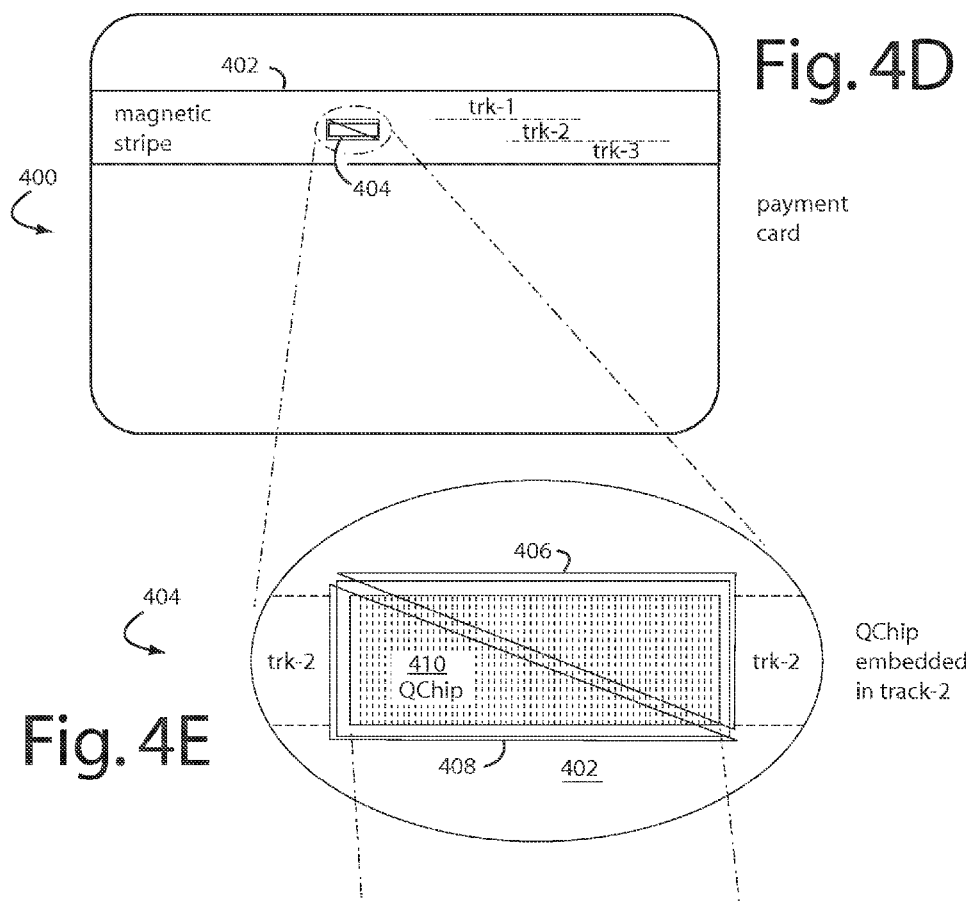
Fig. 4D
Fig. 4E
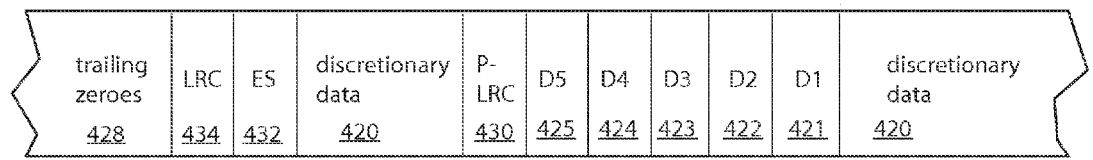
Fig. 4F

Fig. 6 Card CVQ Generation

FINANCIAL TRANSACTIONS WITH DYNAMIC PERSONAL ACCOUNT NUMBERS

RELATED APPLICATION

This Application claims benefit of U.S. Provisional Patent Application Ser. No. 60/764,944, filed Feb. 3, 2006, and titled ENCRYPTED DYNAMIC MAGNETIC STRIPE PAYMENT CARD.

This Application is a continuation-in-part of U.S. patent application Ser. No. 11/404,660, filed Apr. 14, 2006, now U.S. Pat. No. 7,543,739, and titled, AUTOMATED PAYMENT CARD FRAUD DETECTION AND LOCATION; U.S. patent application Ser. No. 11/297,014, filed Dec. 8, 2005 now U.S. Pat. No. 7,472,829, and titled, PAYMENT CARD WITH INTERNALLY GENERATED VIRTUAL ACCOUNT NUMBERS FOR ITS MAGNETIC STRIPE ENCODER AND USER DISPLAY; and also, U.S. patent application Ser. No. 10/800,821, filed Mar. 15, 2004, and titled, THREE-LEGACY MODE PAYMENT CARD WITH PARAMETRIC AUTHENTICATION AND DATA INPUT ELEMENTS. Such are all incorporate herein by reference.

BACKGROUND OF THE INVENTION

1. Field of the Invention

The present invention relates to components and methods for secure financial transactions with consumer payment cards.

2. Description of Related Art

Credit card and debit card use have become ubiquitous throughout the world. Originally, credit cards simply carried embossed numbers that were pressed against a carbon copy bank draft in a mechanical card-swiping machine. Merchants simply accepted any card presented, but then fraud became widespread. The used carbons could even be gathered from trashcans to glean account numbers for unauthorized transactions.

Imposing spending limits and issuing printed lists of lost/stolen cards proved ineffective in preventing fraud and other financial losses. So, merchants were subsequently required to telephone a transaction authorization center to get pre-approval for transactions.

These pre-approvals were initially required only for purchases above a certain limit, but, as time went on, these transaction limits decreased such that more and more transactions required authorization. The volume of telephone traffic increased, the costs associated with each transaction escalated, and customers grew impatient, waiting for authorization calls to complete.

To speed up the authorization process and create an additional barrier for fraudsters, magnetic stripes were added to the embossed numbers and signature panel on credit cards.

Automated authorization systems appeared almost everywhere that allowed faster and easier transactions by reading and verifying the magnetic stripes on the backs of the cards and then handling the authorization process (for those transactions requiring verification) through a communications link. The card readers and computers improved the speed and accuracy of transaction processing and decreased the number of costly human errors. They also allowed near real-time control of fraudulent card usage. But detecting and reacting appropriately to fraud remained a problem.

Several of the elements which are embossed and magnetically recorded on MasterCard, Visa, and other typical payment cards are there to uniquely identify the account cardholder. A standardized personal account number (PAN) comprises four fields, e.g., a system number, a bank/product number, a user account number, and a check character. This PAN is typically sixteen digits but may be up to nineteen digits. The first six digits are called a BIN and represent the card network, the bank and the product for this bank. The last digit is reserved for a calculated value based on the previous digits of the PAN. This digit is calculated using the Luhn formula and assures some measure of data integrity vis-à-vis the PAN digits. The field sizes within the PAN may vary some by issuer. In addition to the PAN the card also has an expiration date associated with the PAN which comprises a month and year code, e.g., four more digits, but with limited range. The cardholder's name and/or business are also usually embossed on the face of the card and all of this data is also typically encoded within the magnetic stripe on the back of the card.

To reduce the level of fraud, several security features have been added to payment cards. The PIN code is primarily used for debit card-present transactions. Since this PIN must not hidden from everyone but the cardholder, such must be entered on secure and certified machines to make sure that no one can gain access to such. The PIN is stored on the magnetic stripe of the card in an encrypted form within a cryptogram block.

Since it was relatively easy for a fraudster to copy the PAN and expiration date of a card and create a copy of that card, the banks introduced a Card Verification Value (CVV) or Card Verification Code (CVC) on the magnetic stripe to make it more difficult for fraudsters to replicate a card (without reading the magnetic stripe). This code is usually a unique cryptogram, created based on the card data and the bank's master key. As a consequence, a fraudster had to gain possession of the card long enough to make a copy of the magnetic stripe in order to duplicate the card.

The same principle was adopted later for a second CVC, sometimes called "CVV2" or "4DBC." The CVV2 is commonly printed in the signature panel on the back of the card, and the 4DBC on the front of the card. CVV2 and 4DBC are used primarily to help secure eCommerce and Mail Order/Telephone Order (MOTO) transactions. A second unique cryptogram created from card data and the bank's master key, albeit different than the magnetic stripe CVC. The CVV2/4DBC is conventionally not present on the magnetic stripe.

There are two major types of transactions, "card-not-present" transactions which involve Internet/eCommerce and MOTO (mail-order/telephone-order) transactions, and "Card-Present" transactions which involve point-of-sale (POS) readers, manual swipe readers, and Automatic Teller Machines (ATM) transactions. Card-Present transactions involve magnetic card readers and always use the full 16-digit PAN (17 digits w/AMEX) and the 4-digit expiration date. Card-not-present transactions require the user to read the embossed PAN and expiration date digits, and sometimes also the CVC/CVV2/4DBC number.

A principal way to stop fraudulent use of a stolen or compromised account number has been to simply cancel the old account number and issue a new one with a new expiration date. So, the issuing banks put in place a mechanism to invalidate old account numbers and to issue new numbers to existing users. But getting the new card could sometimes take weeks, and the delay would greatly inconvenience the user and cause a lull in spending.

With the emergence of eCommerce, more and more transactions are becoming card-not-present transactions. This type of transaction is subject to an increasing number of attacks from fraudsters. Several solutions to address this growing fraud have been developed and deployed. Such include use of Virtual Account numbers, authentication of cardholders separate from transaction, and use of hardware token to authenticate the user.

For example, American Express introduced a service called "Private Payments," Orbiscom (Ireland) has "Controlled Payment Numbers," and Discover Desktop and Citibank (New York) have similar products referred to as a "Virtual Account Numbers". All of these solutions allow cardholders to shop online without having to transmit their actual card details over the Internet. Instead, these systems generate substitute single-use credit card numbers for secure online purchasing. The virtual number generator is either downloaded to the user's computer or accessed online. The user returns to the website for another new virtual number for subsequent transactions. Neither the merchant nor a card-number skimmer can use the number after its first use. So, seeing or having the virtual account number will do them no good if the user has already completed the intended transaction. The user is thus protected from fraudulent transactions because the virtual number is moved to an exclusion list. This also prevents an authorized merchant from automatically initiating future charges that a user may not have really agreed to nor been aware of.

A limitation with using Virtual Account Numbers is such requires the use of the Internet or at least a personal computer to get each new number, and the transactions must be online. POS or ATM use with magnetic card readers still obtain the real account number and continue to be subject to fraud.

Another example is Visa that has developed and is providing Verified by Visa to its member banks. This service once adopted by a bank is used by its customers at merchants' sites equipped to handle this type of transaction at checkout. The concept is when a customer wants to pay, he/she receives directly from the issuing bank a request on the screen to authenticate him/herself with a login and password. This way, the issuer knows that the right person is making the purchase.

Another example is the use of token authentication numbers. These tokes are cryptographically generated numbers generated by a small handheld fob device or card that are used to identify the account holder. The usually interact with an intermediary or the issuer's IT system for verification of the account holder. They do not interact directly, and are not directly associated with the PAN or user account data.

SUMMARY OF THE INVENTION

Briefly, a payment card embodiment of the present invention comprises an internal dynamic account number generator and a user display for card-not-present transactions. Card-Present transactions with merchant card readers are enabled by a magnetic array internally associated with the card's magnetic stripe. The internal dynamic account number generator is able to reprogram some of the magnetic bits encoded in the magnetic stripe to reflect the latest virtual account number. The internal dynamic account number generator produces a sequence of dynamic numbers that can be predicted and approved by the issuing bank. A server for the issuing bank logs the merchant locations associated with each use or attempted use, and provides real-time detection of fraudulent attempts to use a dynamic account number. Law enforcement efforts can then be directed in a timely and useful way.

An advantage of the present invention is a payment card is provided for use with existing legacy payment card systems.

A further advantage of the present invention is a payment card is provided that can help protect the user, the merchant and the issuing bank from fraud.

A still further advantage of the present invention is that a payment card is provided that does not require hardware or software changes to merchant point-of-sale terminals or Automatic Teller machines.

Another advantage of the present invention is that a card is provided that can express the personalities of several different kinds of payment cards issued by independent payment processors.

Another advantage of the present invention is a payment card is provided that can generate a dynamic account number upon each usage, and by doing so, authenticate itself to the transaction infrastructure.

Another advantage of the present invention is that a system is provided that can identify when and where a transaction takes place. For example, if a card is skimmed by a waiter in a restaurant, the issuing bank will have sufficient data to determine when and where the fraud occurred based on the transaction date and the merchant ID of the transaction.

A further advantage of the present invention is that a payment card is provided that is not as easy to duplicate and use. Re-encoding of the magstripe with a stolen number by a fraudster will not work anymore as such did before, since the magnetic stripe information changes with each transaction.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIGS. 4A-4F are plan-view diagrams of a payment card in FIGS. 4A and 4C, its QChip embedded in its magnetic stripe in FIGS. 4B and 4D, and the magnetic data organization when the QChip forms the last few bits and LRC in FIG. 4C, and when the QChip forms some middle bits in the discretionary data field and uses a pseudo-LRC to allow the real LRC to remain static;

DETAILED DESCRIPTION OF THE INVENTION

Embodiments of the present invention allow the use of a card-holder's real personal account number (PAN) such that an issuing bank can authorize all transactions without support from a third party. The PAN and expiration date can be partitioned amongst 100M users and still have PIN-level (4-digit) security, assuming 2% of users are dispersed over each month in a range of forty-eight months worth of expiration dates. A dynamic card verification value (CVV2/4DBC) number can be included and communicated to the user via a small liquid crystal display (LCD). Such technologies combined with dynamic readouts permit secure card-not-present usage.

Figure 1:
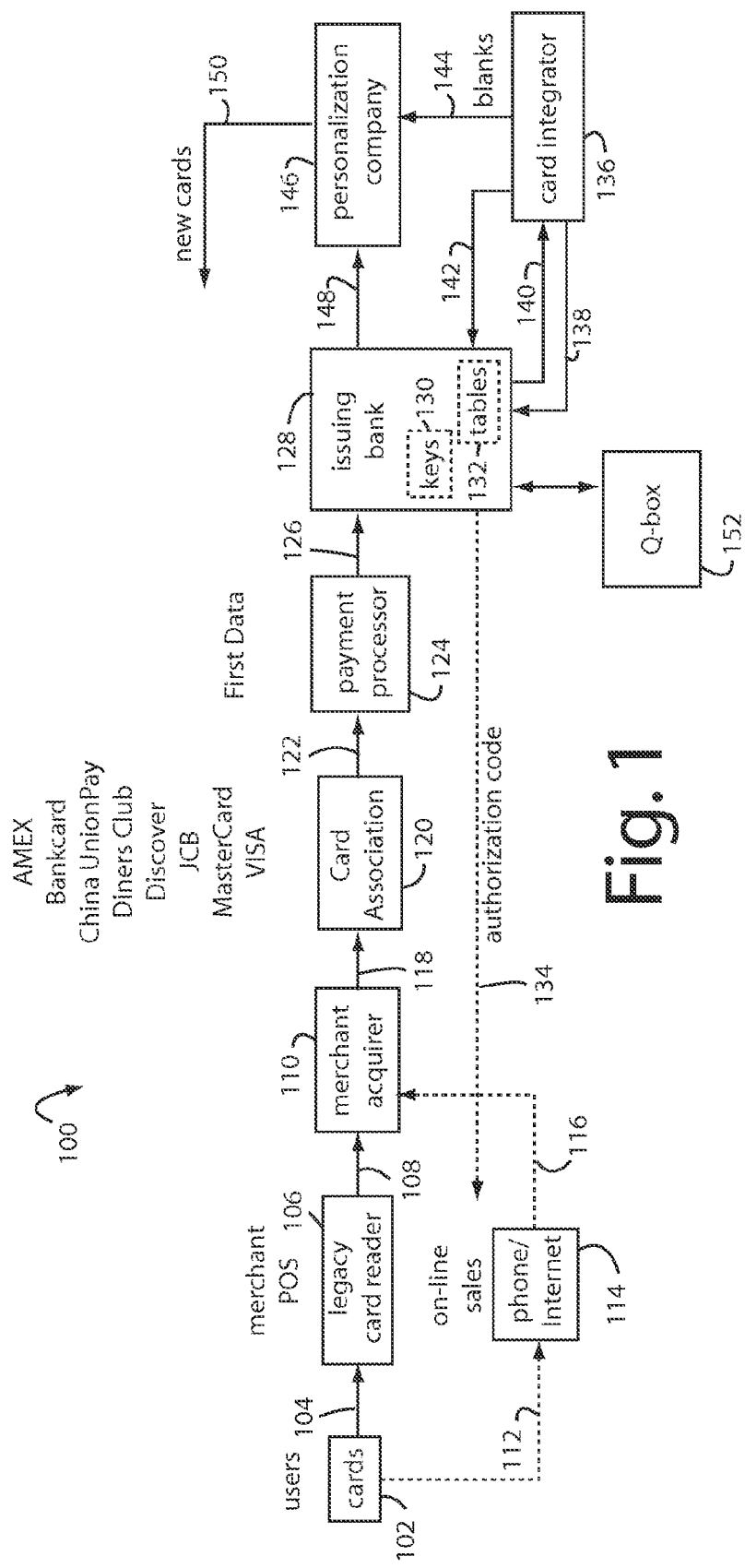
FIG. 1 is a functional block diagram of a financial transaction network embodiment of the present invention.

FIG. 1 illustrates a secure financial transaction network embodiment of the present invention, and is referred to herein by the general reference numeral 100. A population of user payment cards is represented here by cards 102. These cards each include dynamic magnetic stripes and/or displays that change the personal account number (PAN), expiration date, and/or card verification value (CVV2/4DBC) according to precomputed values loaded into Crypto tables embedded in each card. Each transaction produces a new combination of PAN, expiration date, and CVV that is unique and useful only once.

In alternative embodiments of the present invention, payment cards 102 can include credit cards, debit cards, loyalty cards, and other types in these general formats. Crypto-tables can be substituted in some instances and for specific applications by crypto-text generated by on-board, embedded, secure processors.

In the case of the PAN card, each transaction varies some, but not all, of the information. The PAN, expiration date, or the CVV2/4DBC could all be varied, but most initial implementations are likely to vary only one of them, e.g., the CVV2/4DBC. Varying the expiration date to be difficult to manage from a card logistics point-of-view. Varying a portion of the PAN may not be practical without increasing the PAN size, but that may cause some infrastructure incompatibilities.

A visual display included in payment cards 102 can present each unique PAN, CVV2/4DBC, and/or expiration date on a user display in parallel with the presentation of dynamic magnetic data so a card user can complete a card-not-present transaction if no legacy magnetic card reader can be involved. The parent applications incorporated herein by reference provide construction and operational details of such user displays.

A point-of-sale (POS) merchant location machine-reads the swipe data 104 in a legacy card reader 106. The PAN, expiration date, and CVV, and are attached a transaction value and merchant identification. The CVV2/4DBC and even a billing zip code can be read off by the user and keyed into a POS terminal by the merchant. These are electronically forwarded in a message 108 to a merchant acquirer 110.

Alternatively, for card-not-resent transactions, users read the PAN, expiration date, and CVV2/4DBC values 112 from embossing, printing, and/or an onboard display and speak them into a phone, or key them in while logged onto an Internet sales merchant 114. Such data are forwarded in an electronic message 116 that also includes the transaction value and merchant identification. The merchant acquirer 110 collects these financial transaction requests for approval into a message 118 to a card association 120 e.g., AMEX, MC, VISA. A transaction request 122 is forwarded to a payment processor 124, e.g., First Data in the United States. A transaction request 126 from the payment processor 124 is received by an issuing bank 128. Here, encryption keys 130 and/or Crypto tables 132 are used to authenticate the user. If the transaction is approved, an authorization code 134 is returned to the retail merchant 106 or 114.

Messages 104, 112, 108, 116, 118, 122, and 126 do not need a great deal of security protection as in prior art systems. The information is unique for each transaction and is valueless to all but the card 102 and the issuing bank 128. Such message data could be copied, but it cannot be used in another transaction. The issuing bank 128 records each message 126 received, and the merchant location and time of last legitimate use will be logged. If an attempt at fraud were to occur, the copied data would identify where and when the security breach had occurred, and it would succeed because this transaction data would be flagged as having already been used.

Cards 102 are constantly being added, in the case of new accounts and replaced, in the case of card periodic re-issuance. The issuing bank 128 begins by requesting a new lot of cards from a card integrator 136 in an order 138. A quotation and schedule 140 are returned to the issuing bank. An order is placed and production begins. The card integrator 136 produces card blanks with magnetic stripes, MEMS magnetic devices, embossing and logos. It then signals 142 the issuing bank when the cards are being forwarded in a delivery 144 to a personalization company 146. The issuing bank 128 releases personalization information in a secure message 148 to the personalization company 146 that includes the corresponding users' names, addresses, account numbers, expiration dates, etc. In the case of conventional smart cards, some banks will also release their encryption keys 130 to the personalization company. But embodiments of the present invention only release Crypto tables 132 in secure message 148. A set of newly minted cards 150 join the circulating population.

Crypto tables can be generated either by a bank or by a personalization company, and then programmed into the cards during the personalization step. The bank can control the entire cryptogram generation process and does not have to share table generation keys or algorithm details. Each card can in fact use entirely different cryptographic schemes.

The overall system is secured end-to-end by providing the technology that goes into the card 102 the member uses and a hardware security module (HSM), Q-box 152. In some cases, users are provided a reference design for Q-box 152 and will implement their own algorithms on their own boxes or on existing systems. A Q-box or other new tooling can be added to the personalization process since the programming of the QChip within the stripe needs to be done by a new piece of equipment and such can include technology licensed to end-users who will do their own implementations.

In one instance, Q-box 152 provides an adaptive profile algorithm that opens and closes around the odd cycles of normal buyer behavior, coupon issuances, loyalty programs and campaigns, etc. The overall network security is provided by a combination of physical science and usage model technologies.

In a typical 16-digit credit/debit card personal account number (PAN) (XXXX XXXX XXXX XXXX), the first digit is a card system identifier (VISA/MC/AMEX), the next 5-digits are a bank identification number (BIN), and next 9-digits are the individual user account number, and the longitudinal redundancy check character (LRC). An issuing bank 128 may have twenty BIN numbers and twenty encryption keys.

Wrapping the 16-digit PAN with an expiration date (MM/YY) allows each month in a 48-month period to see the expiration of 2% of user card population. Requiring the expiration date (MM/YY) with every transaction helps increase security and frees up more digits in the 16-digit PAN for each user card to recycle. Given the typical numbers of cards being issued to users by banks, at least 4-digits in the PAN can be used for Crypto-table 132 instances.

Banks are very reluctant to allow their encryption keys 130 outside their walls because a single key can be valid for a million cards. If one such key 130 is compromised, the whole lot of cards 102 using it will be compromised. The alternative is to release tables of values 132 pre-computed for each card 102 by appropriate encryption processors.

In embodiments of the present invention, the issuing banks generate a table of results 132 using a cryptography seed, or initialization vector (Iv) and a key (unique for a card or for a small population of cards). The encryption keys never have to be communicated outside the issuing bank 128, only the results in tables 132 are sent to the personalization company 146. Each card 102 has only its particular table values, and hacking one card does not compromise any other card. The cards therefore do not need expensive chips to do DES or other cryptographic processing, or that include special provisions to self-destruct if hacked.

Not having to transmit the encryption keys 130 themselves to the personalization companies 146 reduces costs and limits the dissemination of these keys and the algorithms themselves. The cryptographic results tables are sent over a secure channel. Bonding costs, insurance, risk exposure, security expense, etc., are all reduced. Of course, the issuer may still opt to have the personalization company generate the cryptographic tables.

A business model embodiment of the present invention provides for the manufacture and control of payment cares used in consumer financial transactions. A population of payments cards 102 with user identification and account access codes is circulated. Each use of an individual card produces a variation of its user access code according to an encryption program with encryption keys or initialization vectors. Then, the job of personalizing payment cards with the user identification and account access codes can be confidently outsourced to a personalization company 146. The encryption keys and initialization vectors can be kept private from the outsource companies by using an encryption program to generate tables of pre-computed results, e.g., Crypto tables 132. Respective ones of the tables of computed results are sent out for loading by the personalization company 146 into new payments cards 102.

The parent United States Patent Applications, of which this is a continuation-in-part, describe in detail how machine readability of the variations of user access codes in the population of payments cards is implemented with a magnetic MEMS device embedded in a magnetic stripe included with each payment card. Secure point-of-sale (POS) payments are thus enabled. User readability of such variations in the user access codes is provided with a display device embedded in each payment card. That way, secure card-not-present transactions are supported.

Three or four digits in a banking industry standard 16-digit credit/debit card account number can be defined to be dynamic and to communicate to an issuing bank, in real-time during a financial transaction, selected entries in a payment card's table of computed results. Or, the card verification value (CVV2/4DBC) digits associated with a credit/debit card account number can be defined to be dynamic and to communicate selected entries in a payment card's table of pre-computed results to help authentication.

Interchange fees are charged by the merchant's acquirer 110 to a card-accepting merchant 106 or 114 as component of the so-called merchant discount fee. The merchant pays a merchant discount fee that is typically 2-3 percent. The percentage is negotiated, and will vary from merchant to merchant, and from card to card. Business and rewards cards generally cost the merchants more to process. Some parts of the fees are paid to the processing network 124, the card association 120, and the merchant's acquirer 110. With a corporate card, the interchange fees are also often shared by the company in whose name the card is issued, e.g., as an incentive to use that issuer's card instead of some other.

The exact interchange fees applied to particular merchants depend on the type of merchant, their average dollar amounts, whether the cards are physically present, if the card's magnetic stripe is read or if the transaction is hand-keyed, the specific type of card, when the transaction is settled, the authorized and settled transaction amounts, etc. For some credit card issuers, the interchange fees represent about fifteen percent of their total revenues. This can vary greatly with the type of customers represented in their portfolio. Customers who carry high balances may generate low interchange revenue due to credit line limitations, while customers who use their cards for business and spend hundreds of thousands of dollars a year on their cards while paying off balances every month will have very healthy interchange revenues.

The transaction processing done by the payment processors 124 is designed to maintain a database in a known, consistent state. It does this by ensuring that any interdependent operations carried out on the database are either all completed successfully, or all cancelled together. Transaction processing allows multiple individual operations on a database to be linked together automatically as a single, indivisible transaction. The transaction-processing system ensures that either all operations in a transaction are completed without error, or none of them are. If some of the operations are completed but errors occur when the others are attempted, the transaction-processing system rolls back all of the operations of the transaction, thereby erasing all traces of the transaction and restoring the database to the consistent, known state that it was in before processing of the transaction began. If all operations of a transaction are completed successfully, the transaction is committed to by the system. All changes to the database are made permanent. The transaction cannot thereafter be rolled back.

Transaction processing guards against hardware and software errors that might leave a transaction partially completed, with a database left in an unknown, inconsistent state. If the computer system crashes in the middle of a transaction, the transaction processing system guarantees that operations in uncommitted or not completely processed transactions are cancelled.

In financial network 100, an elaborate public key type scheme is not needed since the issuing banks 128 control both sides of the transaction process, e.g., the card generation and the authorization server. There is no secret key on the card, the card has the tables generated with the key but the key is not stored on the card. Each card, or small population of cards, uses a unique key, so hacking a particular card gives no information on the rest of the card population. So, what has to be protected against is someone being able to read the table and produce other cards using this table, e.g., to duplicate a particular card. If the card is tamper evident, a hacker cannot gain access to a card for some time, somehow read the table and then replace the card unbeknownst to the cardholder and without any apparent damage to the card. The card holder will be aware that something is wrong, and the scope of any sophisticated fraud attempt is very limited.

Increasing the number of keys used for a particular card issued can minimize the risk associated with a compromised key. The card and the issuing bank 128 and its network server must be synchronized to the expected index location within the card's pre-computed table. A sliding dynamically-sized window on the server can predict which pre-computed values are valid at any given time, based on the last valid transaction number received, the data/time of that transaction, the merchant Id for that transaction, etc. They can lose absolute synchronization, so embodiments of the present invention must allow a window of valid entries at any one time and some means to re-synchronize should synchronization be lost. Such window is maintained on the issuing bank 128 and its network server. The window size and rules are specified during a network server specification phase and are empirically refined.

Figure 2:
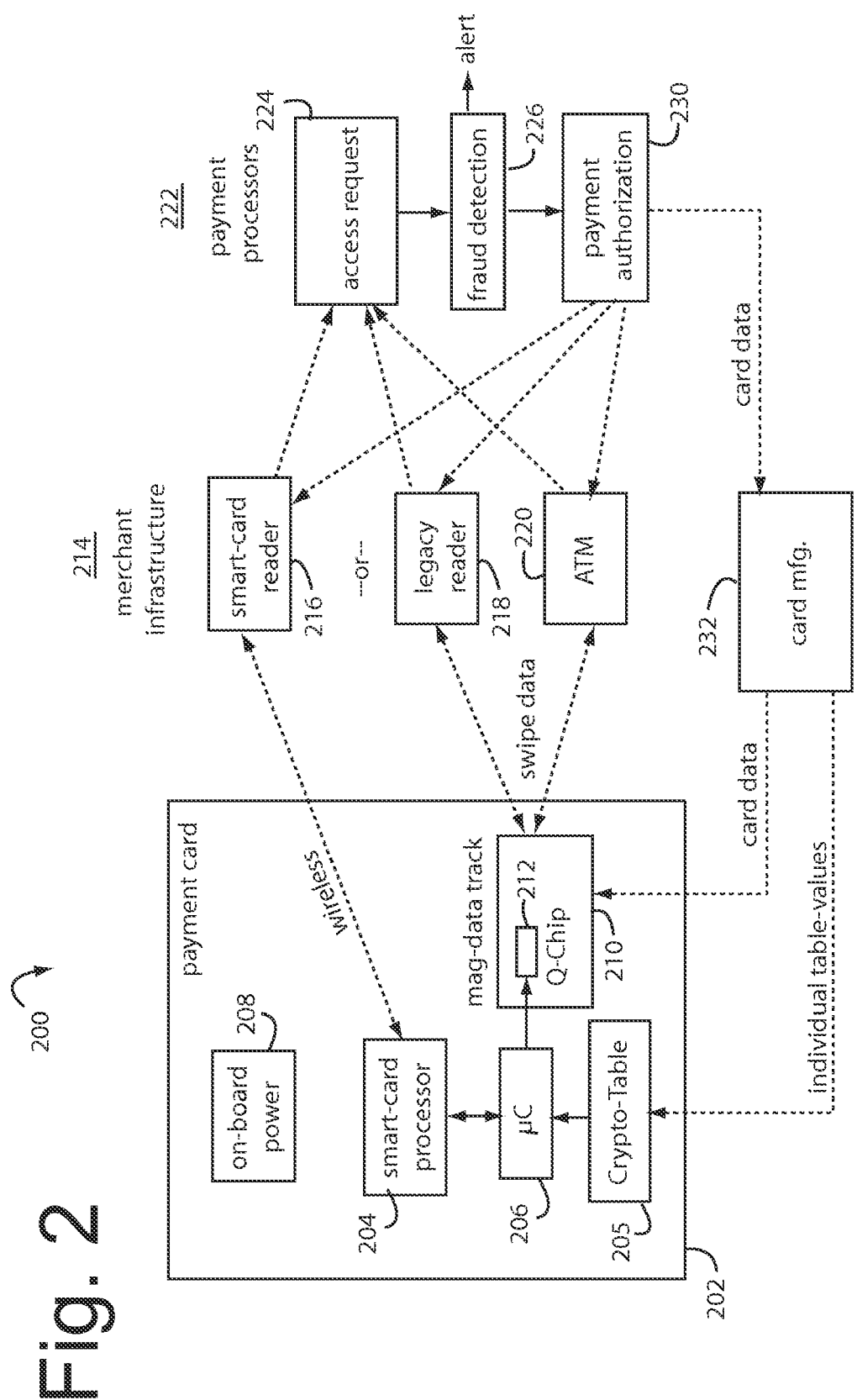
FIG. 2 is a functional block diagram of a magnetic-stripe/contactless payment card system embodiment of the present invention.

FIG. 2 shows how magnetic stripe and contact/contactless financial network infrastructures can be simultaneously supported. Loyalty and reward program information and data generated in the contact/contactless financial network infrastructure can be flagged or signaled in the dynamic portion of a magnetic stripe.

For example, a credit card system 200, in an embodiment of the present invention, comprises a payment card 202 in a credit-card format, an industry-standard contact/contactless smart-card processor 204, a crypto-table or run-time cryptographic algorithm 205, a "Q-Chip" microcontroller 206 to access the crypto-table or run a cryptographic algorithm, a battery 208, and a magnetic data track 210 that includes a magnetic Q-Chip MEMS device with integrated swipe sensor, or off-chip swipe sensor 212. Such microcontroller (µC) 206 and Q-Chip MEMS device 212 are described more completely in U.S. patent application Ser. No. 21/478,758, filed Jun. 29, 2006, titled Q-Chip MEMS MAGNETIC DEVICE; U.S. patent application Ser. No. 21/404,660, filed Apr. 14, 2006, titled AUTOMATIC PAYMENT CARD FRAUD DETECTION AND LOCATION; and U.S. Pat. No. 7,044, 394 B2, issued May 16, 2006. The whole of the magnetic data in track 210 is partially affected by the microcontroller (µC) 206 through Q-Chip MEMS device 212 according to cryptotable or locally derived values.

A present-day point-of-sale community is represented by a merchant infrastructure 214, in that a mixture of contact/contactless smart-card readers 216, and magnetic readers 218 and ATM's 220 can be encountered by consumers using payment card 202. These communicate transaction information and payment requests to a payment processor 222 to authenticate the user account and approve the transaction. These may include coupon, incentives, or loyalty program indicia that can qualify the user for discounts and other rewards. If appropriate, the rewards are communicated back through contact/contactless processor 204 and ultimately to Q-Chip MEMS device 212. A magnetic bit flag may be set in track 210 to indicate the payment card 202 is authorized for micropayments, can redeem a coupon, etc. Additionally, the Q-Chip can relay such basic information as power status, functionality, and number of swipe transactions to the contact/contactless processor 204 for communication to the contact/contactless infrastructure.

Payment processor 222 includes an account access request process 224, a fraud detection process 226, and a payment authorization process 230. These may also be used to administer loyalty program and inter-partner data exchanges, especially when program data must be bridged bi-directionally between the magnetic payment infrastructure and contact/contactless smart-card payment infrastructure via payment card 202. Herein, the magnetic payment infrastructure is represented by all the legacy readers 218 and ATM's 220, and their supporting payment processors 222 deployed in the world. The contact/contactless smart-card payment infrastructure is represented by all the smart-card readers 216 and their supporting payment processors 222 deployed around the world.

The dimensions, materials, magnetics, recordings, and data formats used by card 202 are dictated by industry "ISO standards" for bank payment cards and specifications for contact/contactless smart-card standards reference similar industry ISO Standards, including, but not limited to, ISO 7810, 7816, 14443 use. (See, www.emvco.com for the specific relating to the EMV standards.) The several components described herein all must fit within these constraints. The merchant infrastructure 214 and payment server 222 represented in FIG. 2 are typical, many other variations exist but still can benefit from embodiments of the present invention.

In a micropayment enabled magnetic stripe (MEMS2) embodiment, a micropayment is authorized for a small mount without showing ID or signature, e.g., for American Express this is limited to $100, and for Visa and MasterCard it's limited to $25. In the prior art, such is only available in the USA using contact/contactless technology, although contact/contactless technology is being implemented in Europe, possibly displaying the more prevalent contact-EMV technology implemented during the last decade. A contact/contactless authorization is loaded here and is tracked by a status bit in the magnetic data track 210 to enable a magnetic stripe micropayment. Supporting software is required to be installed in preexisting merchant structure 214 and/or the payment processor 222.

Magnetic data track 210 provides intelligence and feedback. The MEMS coil array can be used as a receiver during a personalization process to load data through inductive coupling. Card swipe sensors integrated on the top surface of the MEMS device are used to count transactions, not swipes. A single transaction may require a few swipes to get the card properly read such as if the reader is dirty or defective.

A promoter could advertise that after a hundred uses of their card, the user will be entered into a sweepstakes contest, or has earned a free cup of coffee, etc. The swipe data can be uploaded, via the microcontroller (µC) 206, back up to the contact/contactless processor 204, enabling a contact/contactless coupon exchanged from the magnetic data track 210.

The magnetic data track 210 can be used to store a battery status. When microcontroller (µC) 206 senses low battery condition, it writes a unique code into the discretionary field after the issuer-defined transaction window of approximately 5 minutes. Alternatively, this field can be rewritten after five minutes with a new code, e.g., in case of component failure or low battery where there isn't enough power or ability to write a next result. The issuing bank, or other entity in the transaction loop, reads the code, and sends out a new replacement card when appropriate. During such dead battery time, the banks may chose to nevertheless approve transactions as they normally do with card with a completely static magnetic data track, if the fraud/coupon component gets stopped.

The magnetic data track 210 can communicate with the contact/contactless chip, and to other magnetic data track terminals, enabling information sharing that ranges from card swipe counting to bi-directional contact/contactless coupon sharing. The ISO 7810/7816 specifications and ABA/IATA stripe data fields describe a "discretionary field", and "other data field" that can be used exclusively for the issuing bank. These can be used to place operators, which can be as simple as a single status bit.

The variable data field uses include fraud control, points of original compromise identification, multiple cards selection, multiple accounts selection, coupon programs, loyalty and branding programs, power monitoring, etc.

The microcontroller (μC) 206 is able to communicate at least three different levels of status to the mag stripe and/or contact/contactless. If the Q-Chip 212 itself is physically broken, then the magnetic domain gaps will be incorrect, or the magnetic domains will be scattered, resulting in an error at the merchant point-of-sale (POS). If the microcontroller (μC) 206 always writes a special code to the Q-Chip 212 after every five minute (issuer defined) window, such as "00000", then a dead battery, faulty microprocessor, or other interconnect problem, will result in this code being transmitted with the next transaction. If the microcontroller (μC) 206 and related circuitry is operational, then a new code will be generated with each POS swipe, assuming it is past the issuer-defined window. So, dysfunctional circuitry will result in a special code being transmitted through the financial transaction network. It is up the bank rules-based-system to determine what action should be taken, e.g., pass the transaction, much like a regular card, and send out a new card, etc. A field of all zeroes does not need to be written, a number that would never occur from the crypto-table 205, e.g., an exception number can be placed to signal the error. If the microcontroller (μC) 206 data appears static, then the card being used is probably a skimmed copy and easy to spot. It's possible it may be a dysfunctional card with a microcontroller (μC) 206 with static data, e.g., the battery 208 died on the last transaction and was unable to write the special code after the window time period expired.

The crypto-table 205 can be used to store a set of crypto-text values that have been cryptographically pre-computed by a card manufacture 232 or by the issuer and then preloaded into a look-up table. The values are sequenced by the on-board microcontroller when the card 202 is swiped by a merchant 214. These table values are such that a next valid value cannot be predicted from a presently valid value being used in a current transaction. The whole table of values is only valid for the particular card they are carried in, and compromising them will not assist a hacker in breaching any other card or account. The key used to generate the table is retained by the issuer and/or personalization bureau, and it is not retained on the microcontroller 206 or embedded within the crypto-table 205. As on-board crypto-engine would not have this particular advantage, but may be superior to a simple crypto-table in some applications, e.g., in a challenge/response architecture. However, the security of all cards within the issuer customer base will be greater than a contact/contactless security chip simply because the key is not retained within such controllers.

The Q-Chip microcontroller 206 is awakened, e.g., by a swipe sensor, when the card is used. A next crypto-table value is accessed when needed. Swiping triggers the sending of a result to the Q-Chip MEMS magnetic device 218 in data track 210. The Q-Chip MEMS magnetic device 218 appears, e.g., to a legacy magnetic stripe card reader 218 as the discretionary track data in Track2, Track-1, and/or a portion of the whole magnetically recorded data fields on the relative tracks. The data provided by the Q-Chip MEMS magnetic device 212 can be internally re-written for each transaction. The next crypto-table result can be written after a transaction window period, and stored permanently until the next transaction, whereupon a new crypto-table result will be written.

The next value is written after a time fixed at personalization after a swipe event is detected. The same value is written again nearly immediately after a swipe event, and then a little later the next value. This allows the value to change asynchronously to the swipe event. The "next value" can then be preloaded on the card after the swipe.

Rewriting the same "next value" immediately after the "next swipe" ensures that if the "next value" was somehow erased by some intervening contact with a magnetic field the value is rewritten so that a second swipe of the card will work. So the card should works is nearly all cases on the first swipe, but if the value has been erased it will work anyway on the second swipe of the card.

"Hard" magnetic materials, e.g., with coercivities high enough to support the magnetic data persistence needed to retain the magnetic data after being pulse-written, are included in the Q-Chip MEMS magnetic device. The card readers must be able to read the data long after the initial writing, thereby conserving battery power. This persistence differentiates the Q-Chip from prior art descriptions. But if the coercivity of the hard magnetic materials is too high, then excessive currents in the writing coils will be needed to flip the magnetic bits. This higher currents, if feasible, can severely limit battery life, increase thermal damage to the device and card. So a compromise is needed. Coercivities in the range of 50-600 Oe seem practical at this point in the development. Experimentation and practical experience in actual mass consumer use is needed to refine these parameters. Early experiments and prototypes indicate hard materials with 200-300 Oe is a promising range of compromise. Indeed, the ISO standard for financial transaction card magnetic media was 300 oersteds for 20-30 years, and only recently increased to minimize ambient and stray magnetic field damage to the magnetic media. In future, better batteries should allow higher value materials to be used, e.g., 3500 Oe, the present standard for magnetic media.

Card 202 does not execute an encryption process. Pre-computed numbers are stored in table 205 during personalization. These numbers are encrypted by the issuing bank using a seed associated with the user, or they may be chosen at random and then ordered. The essential idea is that the next valid number cannot be predicted from any numbers that were used before, due to encryption techniques standard to the industry that include DES, 3-DES, AES, and similar. However, the issuing bank can use an encryption processor with a secret key to compute what would be a next valid number. The payment server 214 allows some mis-synchronization for what should be the next valid number, within a range of next valid numbers such as it already knows are associated with the particular card. This mis-synchronization may be due to temporal offsets associated with batch authorization requests arriving the out sequence real-time authorization requests.

The means to communicate information read from the data track 210 to a payment processor 222 preferably relies on presently deployed legacy magnetic stripe card readers 220 and automated teller machines (ATM's) 220 to forward magnetic stripe swipe data to payment processor 222 for authentication, authorization, and payment. Each request is scanned by an access request program 224. If acceptable so far, the payment request is forwarded to a fraud detection program 226. Acceptable crypto-table values that were created or loaded during card manufacturing 216 are computed in the fraud detection program 226 in real-time use as they are presented so they do not need to be stored by the payment processor 214. An alert can be issued if the value was presented before and used without incident. If no fraud is detected, and payment authority is verified, a payment authorization program 230 sends an authorization code to the legacy magnetic stripe card reader 218 or ATM 220.

An add-on program for the payment processor 222 could be provided with its own list of crypto-table values that were loaded into each card during manufacture, and checks these against what it receives in payment requests. Alternatively, a seed vector, or key, and the algorithm and last known value can be stored, with the payment processor deriving the next predicted number in real-time. Large data tables would not need to be stored for each customer and card. The server limits each value to one use, and the location and time of each use are logged. The management of the valid-number window on the server can be set up such that unused numbers expire a fixed time after a later number is received. In some instances, the number may be authorized for multiple uses from known and trusted entities. These entities may include hotels that swipe the card once and charge a night's lodging each day, or with Amazon and PayPal to enable multiple purchases on a stored card number.

A timer can be included in the card in alternative embodiments of the present invention. Such timer is activated on a trigger event, and prevents any other dynamic numbers from being generated until a pre-determined time has elapsed. This prevents copies of magnetic data track 210 data from being accepted in a decision making process to authorize the transactions after a fixed period of time.

Figure 3:
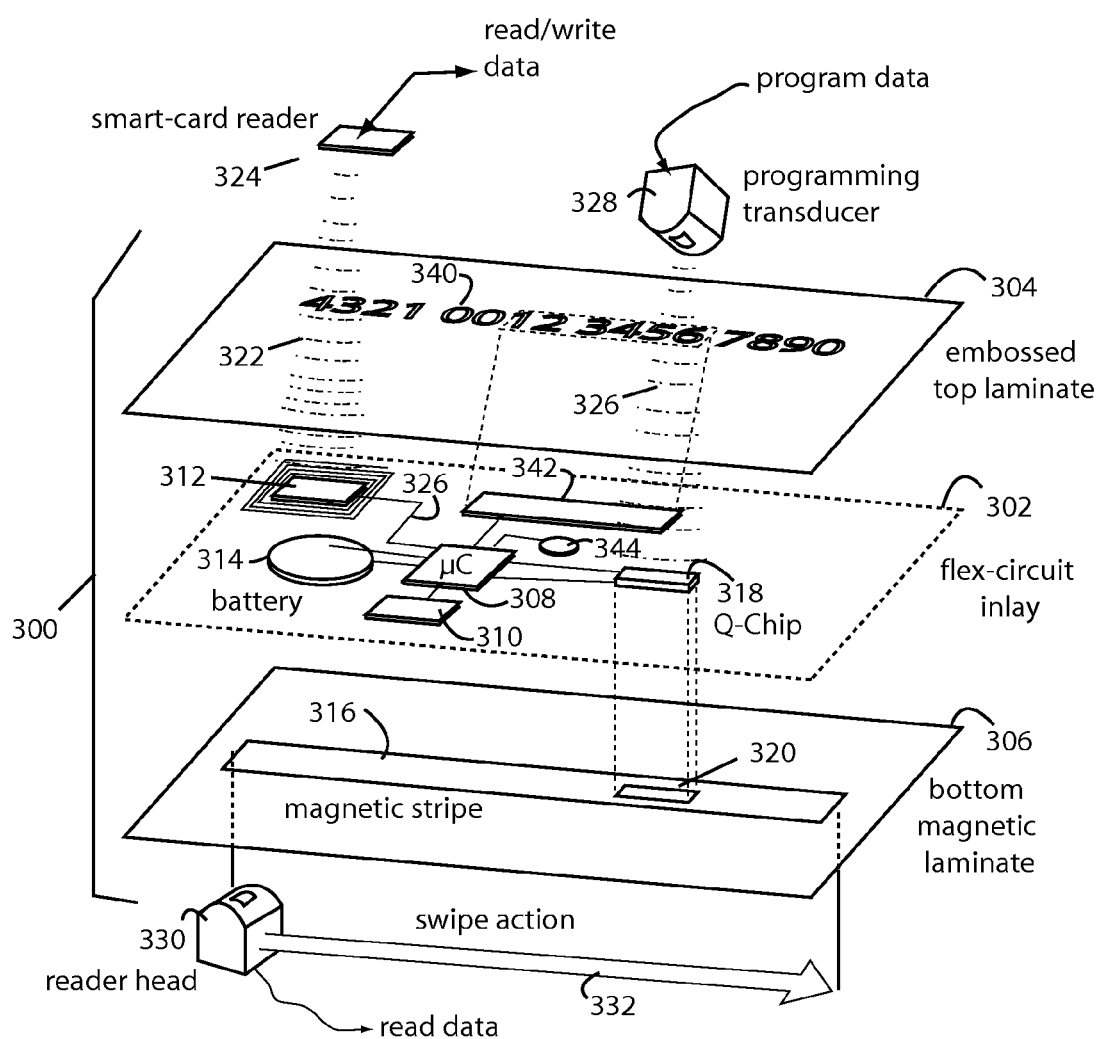
FIG. 3 is a perspective diagram of a payment card embodiment of the present invention showing the assembly of plastic laminates with an flex circuit inlay, battery, QChip, and microcontroller, and further showing the swipe action of a magnetic reader head over the magnetic stripe and wireless interrogation by a smartcard reader.

In FIG. 3, a credit card embodiment of the present invention is referred to herein by the general reference numeral 300. Credit card 300 is constructed with a flexible circuit inlay 302 sandwiched between two outer plastic laminates 304 and 306. It functions and appears to the user to be an ordinary credit card capable of both contact/contactless operation and usage in legacy magnetic card readers. A microcontroller (μC) 308, crypto-table memory 310, and contact/contactless processor 312 are powered, e.g., by a battery 314, and is electrically connected to the contact/contactless chip 312.

Alternatively, a photovoltaic cell, and/or piezoelectric strain generator can be used to provide operating power. Alternatively, an IR receiver or other communication interface generally defined early may substitute or augment the contact/contactless smart chip. A magnetic stripe 316 includes discretionary data fields and the required account access information to be presented during a transaction. A Q-Chip MEMS magnetic device 318 implements a programmable part 320, e.g., as in 112 of FIG. 1 and is installed planar to the card surface. A flexible display 342 and power switch 344 provide a user interface for card-not-present transactions.

An electrical conductivity sensor is included within the Q-Chip MEMS device 318 to detect when the card 300 is being swiped in a legacy magnetic stripe card reader, and when the microcontroller 308 should be activated. The microcontroller 308 is activated only long enough to write the new magnetic data, and the persistence of the magnetic material is relied upon to keep this data presentable for a card reader. Alternatively, swipe sensors may be placed at the ends of the magnetic stripe 316, with electrical interconnect to the microcontroller 308.

In alternative embodiments, the embossed account numbers or CVV2/4DBC printed numbers are replaced by a numeric display which is activated by a finger press, e.g., on an included "Q-power switch" 344. In such a transaction, the magnetic information on the card is not needed. Instead, the card number, expiration date and the card validation/verification value (CVV2) are read off, or entered into online forms, by the user to complete a transaction. Contact/contactless operation, e.g., according to ISO and industry Specification, is conventionally supported by a wireless carrier signal 322 and a merchant's contact/contactless reader 324. Such supports an exchange of coupons, micropayment authorizations, transaction event reports, etc. A link 326 provides for communication between the magnetic receiver element of Q-Chip 318 and the contact/contactless programming transducer 312 of the personalization bureau for purposes of entering crypto-table and other programming data during card manufacturing and personalization.

Payment card 300 resembles a typical payment or bank/ATM card, and conforms to ISO 7810 and other relevant form-factor standards. The payment card industry has published standards (such as ISO/IEC-7810, ISO/IEC-7811 (-1: 6), and ISO/IEC-7813, available from American National Standards Institute NYC, N.Y.), for all aspects of payment cards, and these regulate the card size, thickness, tolerance to flexing, positioning of account numbers and user information, magnetic recording formats on the magnetic stripe on the back, etc. Payment card 300 is compatible with these and contact/contactless industry standards so as to allow rapid assimilation into the payment card system and its use by consumers.

Payment card 300 comprises three pre-lamination layers 302, 304, and 306, which are fused together via a standard injection molding process typically referred to as LIM/RIM, or Liquid Injection Molding, Reaction Injection Molding. Other construction methods can be used, e.g., a solid cast material in which the electronics are embedded, as well as other 'cold' to 'warm' lamination methods. The front, top layer 304 may include a digital user display for displaying a virtual personal account number (PAN). Some of the digits can be fixed and simply embossed and not electrically displayed. An alternative digital user display may be used to display a CVV2/4DBC number result. The middle layer 314 includes electronics for a virtual account number generator 308, a display controller, and a magnetic strip programmer 320. The back layer 316 has a partially programmable magnetic stripe 316 and may have a printed card verification value (CVV2/4DBC).

In order to personalize each card with user-specific data that may include the crypto-table, algorithm, unique keys, or similar after the basic hardware manufacturing is completed, there must some means to insert customized cryptographic information into each card in a post-manufacturing step. Very small needle probes could be inserted at the edge of the card to make contact/contactless with pads on a flex circuit to program the card. Or, these programming pads could be made electrically accessible from somewhere on the surface of the Q-Chip magnetic device. Another method comprises fixed electrical pads presented on the card surface, or via redundant contacts within the contact/contactless chip package. Antenna 312 could be used as well to make such interfaces.

Referring again to FIG. 3, an inductive or wireless coupling communication channel 326 generated by a programming transducer 328 is provided through the Q-Chip MEMS magnetic device 318 back into the associated microcontroller (μC) 308. In normal operation, a legacy magnetic stripe card reader read head 330 is swiped 332 along the magnetic stripe 316 to collect the recorded card data. During the initial card personalization, a special program head with a strong field strength is placed nearby to transmit a pulse and stream of data over an inductive or wireless interface 326. The Q-Chip MEMS magnetic device 318 senses the programming mode, and allows the program head 328 to stream personalization data through the interface to appropriate memory locations in the card electronics, e.g., μC 308 via the Q-Chip 318. Once the programming and verification are completed, the interface 326 can be disabled so that this channel could not be used again. Alternative embodiments include maintaining this channel for use with Near Field Communication or similar wireless communications.

The programmable magnetic stripe will typically have two tracks of data programming written on such by a magnetic card writer, e.g., by a card issuer. Parts of the magnetic stripe are subject to being reprogrammed from within the payment card itself. Such is advantageous if these parts comprise relatively low-coercivity magnetic materials chosen to enable recording by the Q-Chip 318. After the track data has been used in a transaction, the card can be rewritten with new data generated or stored internally. The new data will be unique to each transaction and merchant, so fraud detection is made possible at the issuing banks' payment processing servers.

The basic Q-Chip MEMS magnetic device 318 generally comprises several thin-film coils of wire wrapped end-to-end and encompassing a common, flat, magnetic, possibly ferrous, core. Another instance of the design uses a single coil with multiple taps on it at specific intervals (one tap every sub-interval). These coils are individually driven by the microcontroller and a custom ASIC which takes care of the sequencing and generating the required current profiles. In one instance, such core includes a so-called "hard" magnetic material with a coercivity of 50-600 Oe. The hard magnetic material will serve as the magnetic medium where magnetic data resides.

If the core is made of a "soft" saturable magnetic material with a coercivity of about one Oersted, and a separate media stripe of "hard" magnetic film material overlays respective coils to receive magnetic data transfers from the coils and soft core, then such configuration is referred to herein as a soft magnetic core with hard medium, or simply "soft core".

Magnetic data will persist for a long time in the overlaying hard media. A legacy magnetic stripe card reader could read these recorded data months later, although it may be advantageous to extend or shortened this time for specific applications.

In a data input mode, the thin-film coils with multiple taps can be used as readers to provide updates and new programming to the microcontroller or to initially program/personalize the microcontroller via the microcontroller's in-system-programming interface of via a bootloader previously installed on the microcontroller for this purpose. In this instance, the coil can receive information from specialized interface hardware that induces a changing magnetic field in the core, with such information then being converted to an electronic signal in the coil(s). This signal is then wave-shaped by the electromagnetic circuitry of the Q-Chip and transferred to the microcontroller for digital interpretation and storage. Such a link can be used in manufacturing for programming the microcontroller, and may also be used in a payment environment for firmware updates, etc. A fuse placed within this interface can allow such to be disabled after the personalization process to remove the risk of a hacker probing or using this interface in a fraudulent way.

The implementation of payment card 300 is challenging in that all the electronics need to be very thin and low power. The digital displays must be flexible, and any embedded battery needs to be able to operate the electronics for at least two years of typical use. Conventional, albeit advanced technologies are presently available to fabricate payment card 300 as described. Therefore, a detailed description of those fabrication methods is not necessary here.

Some of the digits of the virtual account number in any display may be fixed. Such fixed numbers can be embossed or printed and not electronically represented. Also the display could also represent alpha-numeric characters, this might allow for the card to display messages, coupons, account name (in the case of a multi-account card). Similarly, some of the data related to the virtual account number and encoded to the magnetic stripe may also be fixed. The fixed bits can be recorded externally by a card writer, while the rest are electronically programmable from within. The fixed bits can represent the card type, and the bank number, e.g., the first 4-5 numbers of the personal account number. There can be some security benefits realized by not writing or displaying the virtual account numbers until they are actually going to be used.

In the case of the display, an on-board timer limits the rate at which virtual numbers can be accessed on the display. Once the power switch is pressed to request a new virtual number for a card-not-present transaction, a new dynamic number is displayed if the display timer has elapsed, otherwise the previous dynamic number is displayed. The number itself may only persist on the display for a short time, e.g., 10-30 seconds in the case of an LCD or not-bistable type of display. Repeated power switch presses will re-display the same number until the display timer elapses, typically 1-5 minutes. Once the timer elapses, pressing the power switch again will restart the display timer and yield a new display number.

Such allows the pre-computed dynamic numbers (cryptograms) to be conserved, and provides increased card security. For example, a waiter taking temporary possession of the card in order to settle the bill can's surreptitiously press the power switch on the card repeatedly and copy a large number of dynamic numbers for later fraudulent use. With a sufficiently large time window between numbers, e.g. 5 minutes, the waiter could perhaps get at most a few numbers before the cardholder became suspicious. Limiting the rate at which new numbers are displayed also reduces the lost numbers that occur when a new cardholder demonstrates their new card to family, friends, coworkers etc. The dynamically displayed number would otherwise be of little use without the timer feature.

In the past, the magnetic recordings laid down in the two or three tracks had some latitude in their exact placement on the magnetic stripe. However, payment card 300 will require that these recordings be properly aligned with the data being represented by the magnetic Q-Chip MEMS magnetic device 318 that sits within the magnetic stripe 320. The fixed track data has to be aligned to the dynamic track data (QChip) well within one sub-interval. In order to bridge the interface between the High-Coercivity fixed media and Low-Coercivity dynamic media, a half-coil (one quarter of a sub-interval) is added to either end of the dynamic media. These half-coils will be programmed in the same orientation as corresponding half-sub-interval regions in the adjoining fixed media in order to ensure that the dynamic media can be written at this interface and to smooth over any magnetic artifacts at the junction. Also since the dynamic element is mechanically assembled into the card there will be some gap (however small) between the fixed media and the dynamic media, this half-sub-interval regions should help provide a continuous signal through this region. For manufacturing processes where there is a discontinuity in the signal at this junction a special glue doped with magnetic material is used to introduce media into this gap so that it somewhat matches the properties of the High-Coercivity media and removes the discontinuity caused by the gap.

A specialized card writer is required for this purpose that can read and store the original recordings, sense the location of the magnetic Q-Chip MEMS magnetic device 318, and write the recordings back in their properly aligned positions.

A magnetic array is arranged on the back of the card 202 behind the magnetic stripe 210. This presents what appears to be an ordinary magnetic stripe encoded with appropriate bank and user information for a conventional magnetic card reader. Such readers are ubiquitous throughout the world at point-of-sale terminals, and therefore it is very important not to require any changes to these readers in order to accommodate the proper use of payment card 300.

Am embedded power source is needed by payment card 300 that can last for the needed service life of a typical card, e.g., about eighteen months to four years. A chemical or MEMS battery or a piezoelectric generator and charger can be used. Such a piezoelectric generator converts incidental temperature excursions and mechanical flexing of the card into electrical power that can charge a storage capacitor or help maintain the battery. A piezoelectric crystal is arranged to receive mechanical energy from card flexing, geo-magnetic induced stress, thermally-induced stress, mechanically-induced stress, and/or keypad use. The charger converts the alternating current (AC) received into direct current (DC) and steps such up to a voltage that will charge the battery. Alternative embodiments can include embedded photovoltaic cells to power the card or charge its battery.

A conventional, "legacy", merchant point-of-sale magnetic-stripe card reader 118 is used to read user account data recorded on a magnetic stripe 216 on the payment card 300. Such is used by a merchant in a traditional way, the payment card 300 appears and functions like an ordinary debit, credit, loyalty, prepay, and similar card with a magnetic stripe on the back.

User account data is recorded on the magnetic stripe 316 using industry-standard formats and encoding, for example, ISO/IEC-7810, ISO/IEC-7811 (−1:6), and ISO/IEC-7813. These standard specify the physical characteristics of the cards, embossing, low-coercivity (e.g., 300-650 Oe) magnetic stripe media characteristics, location of embossed characters, location of data tracks 203, high coercivity (e.g., 2500-4000 Oe) magnetic stripe media characteristics, and financial transaction cards. A typical Track-1, as defined by the International Air Transport Association (IATA), is seventy-nine alphanumeric characters recorded at 210-bits-per-inch (bpi) with 7-bit encoding. A typical Track2, as defined by the American Bankers Association (ABA), is forty numeric characters at 75-bpi with 5-bit encoding, and Track-3 (ISO/IEC-4909) is typically one hundred and seven numeric characters at 210-bpi with 5-bit encoding. Each track has starting the ending sentinels, and a longitudinal redundancy check character (LRC). The Track-1 format includes user primary account information, user name, expiration data, service code, and discretionary data. These tracks conform to the ISO/IEC/IEC Standards 7810, 7811-1-6, and 7813, or other suitable formats.

The magnetic stripe 316 is located on the back surface of payment card 300. A data generator, e.g., implemented with microprocessor 308 and crypto-table 310, receives its initial programming and personalization data from a data receptor. For example, such data receptor can be implemented with the Q-Chip coils themselves or a serial inductor placed under the magnetic stripe. This is then excited by a standard magnetic card writer. Additionally, the data may be installed at the card issuer, bank agency, or manufacturer by existing legacy methods. The data received is stored in non-volatile memory. Alternatively, a data receptor can be a radio frequency antenna and receiver, typical to ISO/IEC/IEC Specifications 14443 (a) (b) and 15693. Alternatively, the data receptor may be an IR device, or Near field Communication (NFC) device. The data generator may be part of a secure processor that can do cryptographic processing, similar to Europay-Mastercard-Visa (EMV) cryptoprocessors used in prior art "smart cards".

Card-swipes generate detection sensing signals from one or a pair of detectors. These may be implemented as top coats over Q-Chip 318 and can sense the conductivity presented across a magnetic read head 330 in a scan and transmit this change to the microcontroller 308. Alternatively, the sensor could detect the pressure change across the face of the sensor as it came in contact with the head.

The legacy magnetic stripe card reader 218 (FIG. 2) and contact/contactless reader 324 (FIG. 3) are conventional commercial units as are already typically deployed throughout the world, but especially in the United States. Such deployment resistance in the world is deep and widespread. The conversion of magnetic readers to contact/contactless and contact/contactless smartcard systems has a been inhibited by merchant reluctance to absorb the costs, to question how many customers really need them, what employee training is needed, the counter space required, and other concerns. Card 300 can work with both systems and provide some of the advantages of the contact/contactless operation to the magnetic-only users.

An important aspect of the present invention is that the outward use of the payment card 300 does not require modifications of the behavior of the user, nor require any special types of card readers. However, some new software may need to be installed by the payment processors to support the appearance of coupons and micropayment authorizations in magnetic stripe supported transactions.

The magnetic-transducer in the Q-Chip MEMS magnetic device 318 must be very thin and small, as they must fit within the relatively thin body of a plastic payment card, and be packed dense enough to conform to the standard recording bit densities in the respective tracks. Integrated combinations of micro-electro-mechanical (MEMS) systems, nanotechnology, and longitudinal and perpendicular ferromagnetics are therefore useful in implementations that use standard semiconductor and magnetic recording thin-film technologies. Reductions in size for the Q-Chip MEMS magnetic device 318 can be achieved by increasing the bit density beyond present ISO standards, in which instance a transaction processor waiver for deviation may be requested. Advantages of size reduction include cost and ruggedness.

In order to manufacture a well bonded and void free electronic financial card 300 capable of passing industry standard ruggedness and aesthetic testing, some internal component surface treatment must be done before bonding. The adhesion strength between the PVC, and other material, pre-lamination sheets to its electronic flexible circuit and thin film battery must be very strong in order to pass the ISO mechanical tests, in particular the torsion, bending the peel tests. If the surface adhesion is poor, then voids, fissures, and fractures inside a finished card will shorten its expected life.

Polyethylene, polypropylene, thermoplastic olefins, PVC, PET, and other sheet plastics are difficult to bond together with typical adhesives. Such plastics have low surface energies and low wetting tension, as measured in dynes/cm. Batteries with copper and acrylic coated aluminum thin film used in the electronic card industry are also difficult to bond together with the other plastic pieces in a laminated card such as card 300 (FIG. 3).

Recent peel tests have shown that most pre-lamination sheets can be peeled off cleanly from electronic inlays and batteries if there have not been any surface treatment. Multiple layers of materials within the card is an expensive and time-consuming process with low yields. Pockets or voids can be provided for the components float, but any air trapped inside can inflate and deflate with temperature and lead to stress fractures and failures.

Embodiments of the present invention use forced air plasma surface treatments to modify the plastic surfaces before bonding with adhesives. Lectro Engineering, Company (St. Louis, Mo.), markets a suitable piece of equipment as the Lectro-Treat III (Lt-III). See, U.S. Pat. No. 5,215,637, issued Jun. 1, 1993 to R. Lee Williams and assigned to Lectro Engineering Co. The LT-III uses a special discharge head to blow a temperature plasma across plastic surfaces. The surface energy and wettability of plastics are improved for better adhesion. See, U.S. Pat. No. 5,798,146, titled SURFACE CHARGING TO IMPROVE WETTABILITY, issued Aug. 25, 1998 to Igor Murokh, et al., and assigned to Tri-Star Technologies (El Segundo, Calif.).

On a molecular level, the plasma process produces fine pits and cracks in the treated surfaces. These pits and cracks allow the adhesives to get a better grip with the increased surface area for a tighter bond. The LT-III process also oxidizes and cross-links the polymers in the plastic surfaces to help with chemical bonding and strength. Copper and/or acrylic coated aluminum batteries will adhere better too if their surfaces are plasma treated this way before bonding.

Other kinds of metal surface treatments are costly and/or not clean enough, e.g., bead/sand blasting, wet chemical etching, etc.

The plasma surface treatments are used in the production line during the card lamination manufacturing process.

Accelerated temperature and humidity tests have shown that battery life and the service life of other components were not adversely affected by the plasma treatments. Such appears safe for all the electronic components used in card 300. The peel strengths of plasma treated aluminum, copper, and acrylic thin film batteries were greatly increased.

One import observation made during testing was the bonding of the pieces needed to be completed within eight hours of the surface plasma treatments. the adhesion and peel strength decays with time after the surface plasma treatment, probably due to oxidation and other aging affects.

Figure 4A:
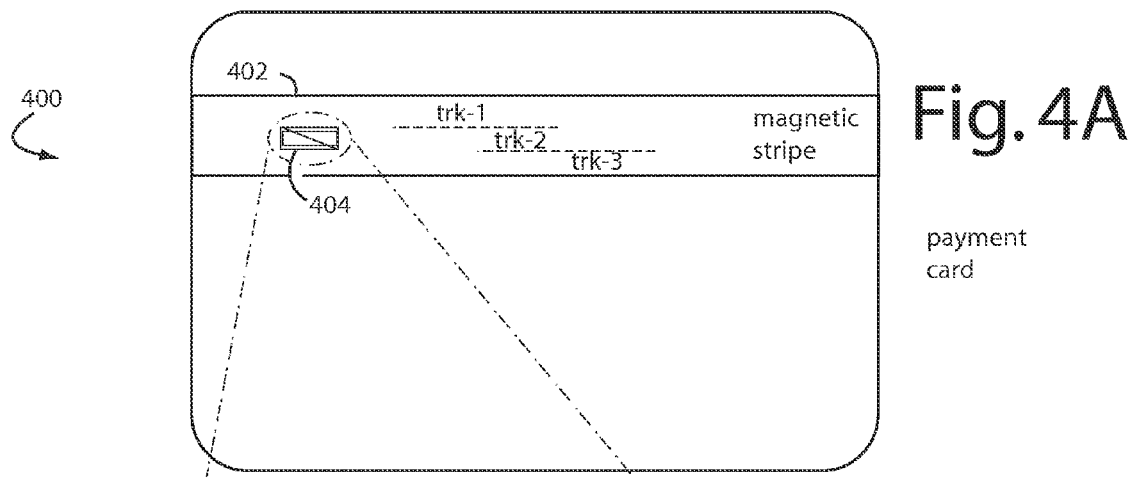
Figure 4B:
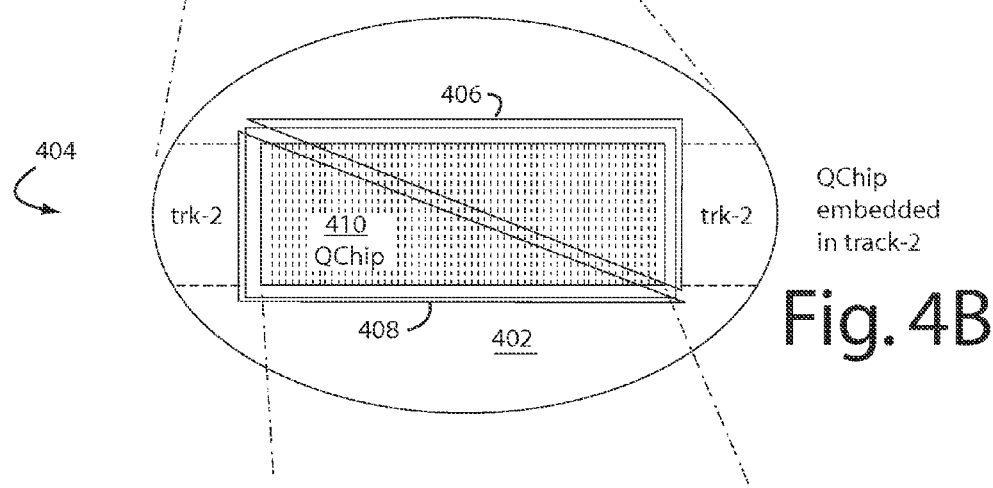
Figure 4C:
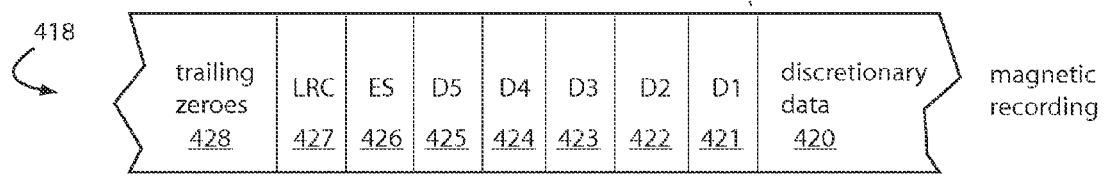

FIGS. 4A-4F show a payment card 400 that includes a magnetic stripe 402 with three recorded tracks, e.g., trk-1, trk-2, and trk-3. These tracks are recorded according to ISO industry standards for payment and credit cards. A dynamic portion 404 of magnetic stripe 402 is located in trk-2. In FIGS. 4A-4C, such dynamic portion 404 is at the end of a discretionary data field, and in FIGS. 4C-4F, the dynamic portion 404 is inside the discretionary data field. In FIGS. 4B and 4D, such dynamic portion 404 comprises a pair of swipe sensor contacts 406 and 408 which overlay a magnetic MEMs device (QChip) 410. The QChip 410 is inlaid flat into magnetic stripe 402 and is aligned with statically recorded trk-2 data.

Swipe contacts 406 and 408 comprise a swipe sensor that is used to detect the change in conductivity that occurs as the card encounters the read-head and its usually metallic shroud. As the head passes over these contacts it creates a low-impedance electrical path between them, which underlying circuitry detects. They present no significant impediment to reading the magnetic data beneath them. The QChip 410 uses the swipe contact event information in a number of ways, e.g., to wake up and present its data, to update the data, to estimate battery life, to count transactions, etc. In addition, these pads may also be used (by providing a DC current across them) to open the fuse used to enable the personalization circuit within the chip, so that it can easily be blown during the personalization operation.

In FIG. 4C, a discretionary data field 420 includes QChip 410 as its last few digits (D1-D5) 421-425, end-sentinel (ES) 426, and longitudinal redundancy check (LRC) 427. The seven characters provided by QChip 410 are dynamic magnetic data characters. A trailing zeroes field 428 is static and follows the LRC 427. The QChip 410 must compute the correct value of LRC 427 from what precedes it in characters (D1-D5) 421-425, ES 426, and in the discretionary data field 420 (which for the purpose of this figure also includes the PAN as well as the start sentinel and field delimiter).

In FIG. 4F, the QChip forms some middle data characters in the discretionary data field and uses a pseudo-LRC 430 to allow an ES 432 and a real LRC 434 to remain static. In this new position, QChip cannot affect LRC 434 because it is positioned outside the borders of dynamic portion 404. So QChip 410 writes pseudo-LRC 430 such that the LRC calculation for the stripe yields the correct fixed LRC value in LRC 434. In this way the reader will see a valid LRC.

The LRC 427 and 434 represents a bitwise exclusive-OR (XOR) of the magnetic stripe data in all of trk-2 from a start sentinel through an end sentinel, 426 or 432. When QChip 410 is positioned as in FIGS. 4A-4C, LRC 427 can be changed to account for D1-D5 421-425 being dynamic. ES 426 is a static character, but because of where it is, it adds another overhead character to the QChip 410. So, in order to simply provide five variable characters, seven characters total must be implemented.

However, both the ES and the LRC can be left hardcoded by using an alternative technique that ensures the LRC will always be valid, e.g., given any new values that could be written to D1-D5 421-425. All but one of the characters in QChip 410 would then be available for use as variable characters if the one character operated as a pseudo-LRC (P-LRC) character. A running XOR value based on the variable-date values is corrected by the P-LRC 430 so that the LRC 434 value at the end of the magnetic stripe will be correct. Such P-LRC 430 value can be placed anywhere within a data field if its calculation is based on the updated variable data values.

The QChip 410 shown in FIGS. 4D-4F can be used to provide an extra data character, or one less digit can be included compared to that in FIGS. 4A-4C. Implementing six, rather than seven digits saves 15% of the chip area, and that can reduce costs and raise yields substantially. A single, larger QChip 410 would be more flexible and useful in different application.

Table-I shows an example of how a pseudo-LRC field can be used that would enable a fixed LRC. On the left half, a segment of static magnetic stripe is shown with a calculated LRC. The digits are encoded 4-bit values and no parity. The "char-bits" column lists the encoding for each character. An XOR value column lists a running cumulative XOR value calculated after each data character. In this example, track-2 encoding is used (four data bits, one parity bit). The same principle can be used with any encoding scheme, for example track-1 (6 data bits, 1 parity bit). A resulting LRC is the last calculated XOR value, e.g., at the bottom.

TABLE I

| data | char-bits | XOR | data | char-bits | XOR |
|---|---|---|---|---|---|
| 0 | 0000 | 0000 | 0 | 0000 | 0000 |
| 1 | 0001 | 0001 | 1 | 0001 | 0001 |
| 2 | 0010 | 0011 | 2 | 0010 | 0011 |
| 3 | 0011 | 0000 | 3 | 0011 | 0000 |
| 4 | 0100 | 0100 | 7 | 0111 | 0111 |
| 5 | 0101 | 0001 | 8 | 1000 | 1111 |
| 6 | 0110 | 0111 | P-LRC | XXXX | 0111 |
| 7 | 0111 | 0000 | 7 | 0111 | 0000 |
| 8 | 1000 | 1000 | 8 | 1000 | 1000 |
| 9 | 1001 | 0001 | 9 | 1001 | 0001 |
| | LRC = 0001 | | | LRC = 0001 | |

The example in the table describes a three character dynamic element with four data bits (parity is ignored for this discussion and would function in the standard way). The dynamic 3-digit component is shown in the right half of Table-I. The 3-digit QChip is represented by the heavy-line box, and is just an example. It could be any practical length. Here, the LRC is fixed, so the running XOR value when it reaches the last dynamic character has to be correct based on the dynamic characters that were presented by the first two positions in the QChip. What the LRC-sum needs to be after the P-LRC character can be exclusive OR'd with the LRC-sum before the P-LRC character, 1111 in this example right-hand side of the table result of the '8' character, to yield the P-LRC value (0111 XORed with 1111=1000).

As shown, the Pseudo-LRC can be easily calculated in real-time based on the dynamic data in order to ensure that the fixed LRC is valid with the new dynamic data. An alternative technique might involve adding all possible digits to our desired cryptograms and then testing each to find out which one validates the fixed LRC. This is a convoluted technique, but could be used instead of the direct calculation scheme described above.

In alternative embodiments of the present invention, the QChip 410 can be anywhere within the magnetic stripe 402. If need be, it ensure that any fixed LRC value will always be correct by sacrificing one character to be used as the pseudo-LRC. If the QChip 410 is placed in the PAN character field, then the last, LUHN formula check digit at the end of the PAN number has to be generated as well. So the QChip 410 is placed at the end of the PAN, one digit is reserved for the LUHN digit, and another for a field separator and then the pseudo-LRC digit is positioned in the first part of the discretionary data.

Figure 5:
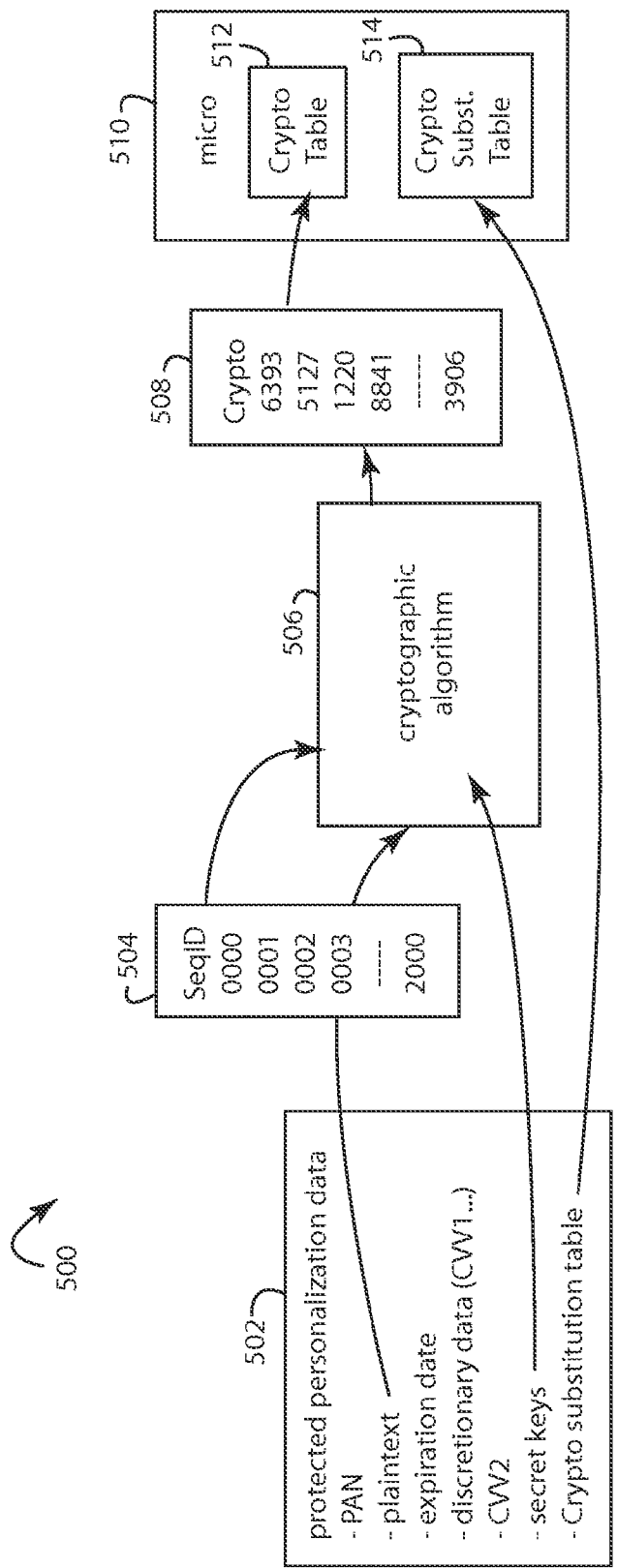
FIG. 5 is a functional block diagram of a payment card personalization system embodiment that can be used with the payment card of FIGS. 1-4A, 4B, 4C, and 4D. The SeqId/Crypto fields are not split, instead a single cryptogram is generated using a four or five digit SeqId or plaintext with a reversible encryption algorithm.

FIG. 5 represents a personalization scheme 500, comprising protected personalization data 502, a sequence ID 504, a cryptographic algorithm 506, crypto values 508, and a microcontroller 510 to store and use a Crypto table 512 and a Crypto substitution table 514. A number of different tables and program code are loaded into microcontroller 510 and stored on a card during its personalization phase. Crypto table 512 is either computed in real-time during personalization, or pre-computed beforehand, and transported to the card integrator in a secure manner for personalization. A reversible cryptographic algorithm 506 with cryptograms of any size could be used, but in practice the cryptograms will be 2-7 characters. The number of cryptograms stored has an impact on the microcontroller memory requirements, so a smaller number of cryptograms could be stored along with substitution table 514, or other secondary less-secure cryptographic algorithm, so that the cryptograms could be reused for high-volume users. This allows for a less expensive microcontroller to be deployed. Both code and data are loaded into the microcontroller 510 during personalization and the microcontroller's access port is secured to prevent subsequent access to either code or data. The card themselves are also designed such that they are both tamper-resistant and temper-evident. Tamper-resistance provides significant difficulty in accessing the microcontroller code or data. Tamper-evidence makes obvious attempts to access the microcontroller, and will leave evidence easily discernible by the cardholder.

To personalize a card, the bank makes protected personalization data 502 available to an approved card integrator (with a certified secure facility/process). For example, a cryptographic table with 1000-3000 entries is created. E.lg., 1-3.5 bytes per entry times 4-bits per digit. Each entry is based on a different sequence ID (SeqId), 0000, 0001, 0002, etc.

The average card-holder engages in 150-200 swipes per year, so on average there will be less than 400-swipes during a typical 2-year life of the card. If the cryptogram tables are sized just a bit larger than that, then the cryptograms need never repeat for the majority of users. For high-volume users, some changes can be made to the cryptograms on subsequent passes through the cryptogram table to increase the level of security, either via a substitution table or via a simple additional algorithm.

For each cryptogram entry, the inputs to the cryptographic algorithm 506 include an appropriate SeqId 504 for that entry, a secret key for the particular cards, and possibly additional plaintext. Since the SeqId 504 is only a few digits long, the algorithm can be made more complex by padding the SeqId with some non-zero plaintext. This effectively provides additional variability and key strength without adding bits to the key directly, such that some available algorithms can be improved and perhaps used. The plaintext can be the PAN, as in CVx type authentication, or some other number altogether that does not appear on the card and is not available to a hacker or fraudster, e.g., for added security.

CVx authentication uses data that is on Track2. The remote server can only authenticate using data on-hand and the bank key. Attacks on the CVQ cryptogram can be made far more difficult by including plaintext that is not repeated in the clear elsewhere on the card.

Figure 6:
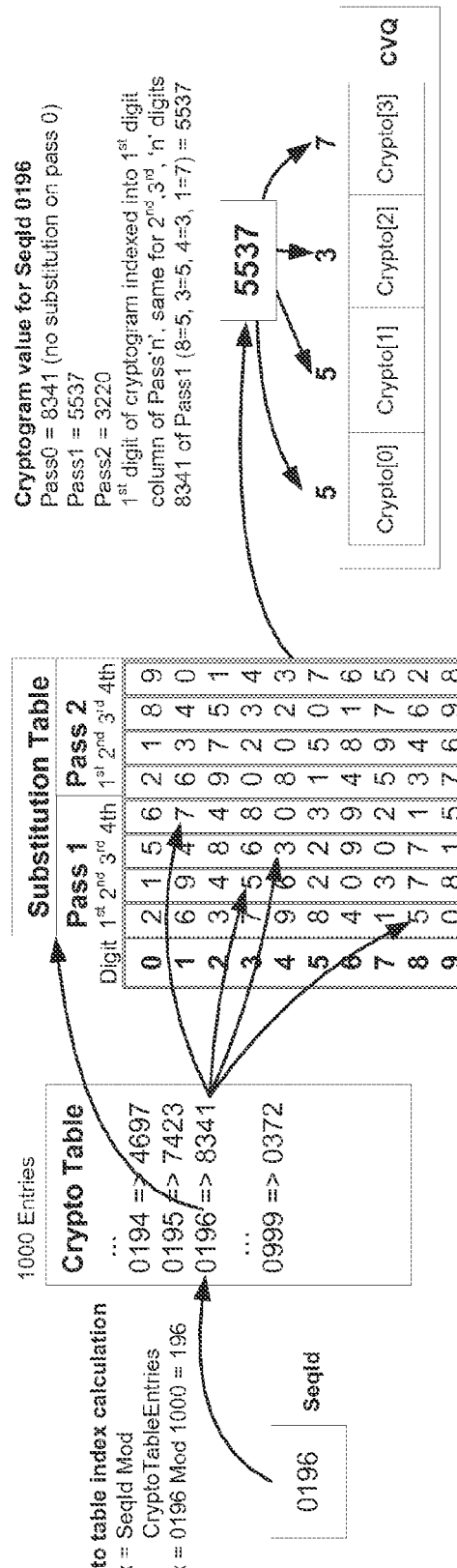
FIG. 6 is a flowchart diagram of a Card CVQ generation method embodiment of the present invention.

Referring now to FIG. 6, when a swipe transaction occurs, a timer is started and the current CVQ is rewritten to the card a second or two after the swipe. This will refresh the current CVQ on the magnetic stripe, in case it was inadvertently erased since it was initially written. One to five minutes after the swipe, the next CVQ cryptogram is pulled from the table. It is run through the substitution table if necessary, and then written to the stripe. This delay curtails fraud in limiting the number of cryptograms a fraudster in limited possession of the card can glean from the card while it's in their possession.

For example in FIG. 6, a SeqId of "0196" yields a cryptogram "8341". The example assumes a 4-digit cryptogram, but it could easily be more or less digits. The first time through the SeqIds, the cryptograms are used as is. The next time through, the cryptograms they are passed through a substitution table for the appropriate pass count. Any number of passes/tables are possible, but substituted cryptograms are not as secure as unique ones, so it's advantageous to keep the number of passes as low as practicable. On the next pass the cryptogram table (pass 1) the SeqId 0196 is substituted into a Pass-1 portion of the table one digit at a time, first digit "8" becomes "5" (first digit column, digit=8), the second digit "3" becomes "5", the third digit "4" becomes "3", and the fourth digit "1" becomes "7", so "834"=>"5537". That cryptogram is then loaded into the appropriate bit positions in the CVQ.

Cryptographic authentication can be done by an external, dedicated cryptographic server. Communication between an authorization server (SAMS) and a cryptographic server (HSM) is possible using a rigid transaction based protocol. The HSM- offers a number of message primitives to the authorization server. A message is built on the authorization server and sent to the cryptographic server for validation. The reverse of the substitution table (if one is implemented) resides on the Server or within the HSM in order to recover the cryptogram.

Figure 7:
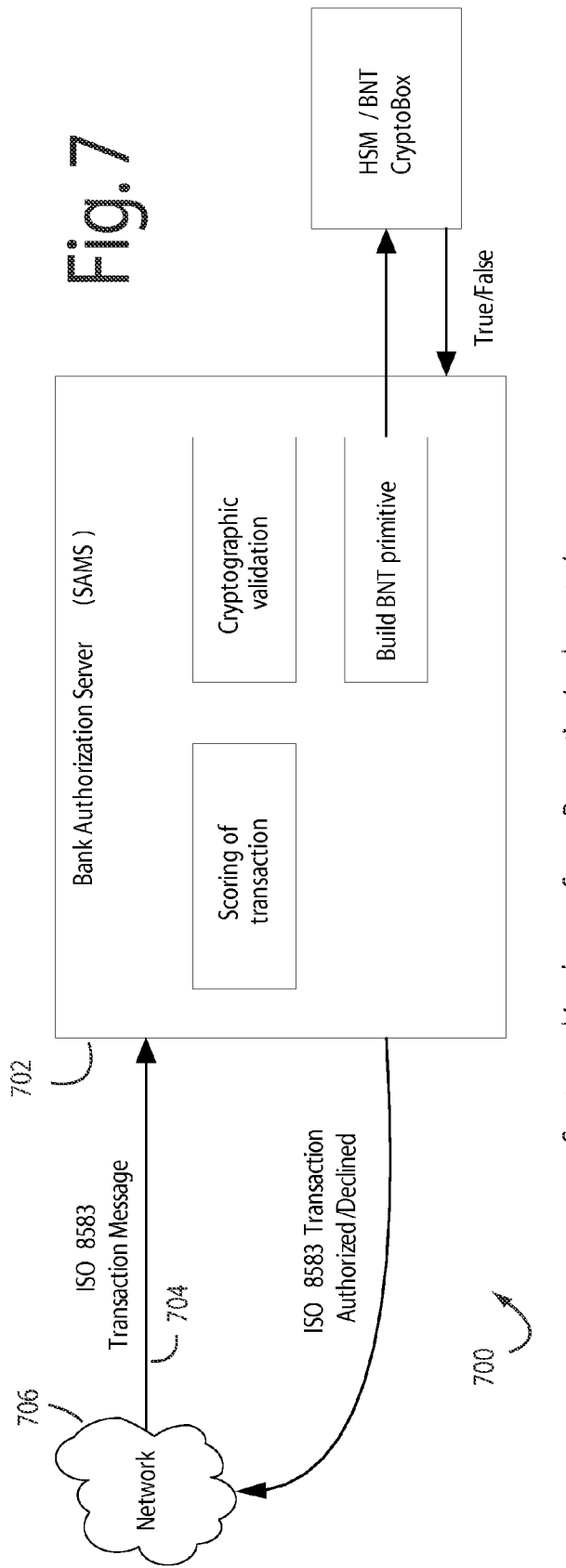
FIG. 7 is a flowchart diagram of a server transaction decryption method embodiment of the present invention.

Referring to FIG. 7, a Cryptographic scheme and server decryption implementation 700, a typical server 702 receives ISO-8583 formatted messages 704 from the network 706. Inside these messages are the network, merchant and card information. The network information determines which server should handle the transaction, e.g., card-present, or card-not-present transactions. The merchant information can be used to help validate a particular transaction. The card information includes the magnetic stripe data, from which the issuing bank 128 and its network server 702 can extract the personal account number (PAN). The PAN is used to access the cardholder validation information. At a high-level, the issuing bank 128 and its network server 702 looks at all of the transaction information and evaluates such against the cardholder context information, e.g., rules, transaction window, etc.

If the transaction is deemed not valid, a message is formatted and the transaction is declined. If the analysis is inconclusive, the card verification number (CVQ) is retrieved from the magnetic stripe. A CVx type primitive is formatted using the transaction CVQ, recovered SequenceId and this is sent to a cryptographic server for validation. The cryptographic server responds with either True or False and the issuing bank 128 and its network server then formats a message that either accepts or declines the transaction based on the cryptographic server response.

It would be preferable in embodiments of the present invention to get away from a True/False reply from the HSM. A result should be returned from the HSM a result-based reply]

There are a number of means by which a SequenceId on a card can lose synchronization with an issuing bank 128 and its network server. E.g., an invalid swipe sensor trigger, where the card was triggered falsely while not in a reader. In order to protect against false triggers, the swipe sensor is preferably triggered by electrical contact rather than simply pressure. In this way, the card will not trigger in a wallet, or elsewhere, and will require a very low resistance path across a non-critical portion of the read-head in order to be activated.

A transaction timer is used to prevent multiple numbers being generated for a single transaction. Once a swipe sensor is activated, a timer is started. A next number can not be generated until the timer times-out. If a card is swiped multiple times during a transaction, the same number will be generated for each swipe until the time-out. The time-out periods are configurable between 1-5 minutes by the issuer during card personalization.

In EMV-ATM (GAB/DAB) transactions, the magstripe can be read before an EMV transaction. Since a bank will be aware of EMV access with a user's card, the bank can advance the SeqId number whenever an EMV-ATM (GAB/DAB) transaction is initiated to account for the magnetic stripe read that occurs in these terminals. If there is no transaction authorization, and only access to bank account, balance check, etc., it may not be possible to synchronize such a swipe transaction, since a different bank server may be involved.

Batch transactions are stored locally and submitted at some later time. These are usually submitted to the issuing bank 128 and its network server in a timely fashion, for example, at the end-of-the-day. The window will re-synchronize when these are received.

Parking and toll transactions are typically not submitted to an authorization server. Instead the magnetic stripe is read locally and the transactions are sent for payment in batch at some later time. If these transactions are sent to the authorization server, they can be accounted for then and the system synchronized. If not, perhaps a link between the issuing bank 128 and its network server that receives them and the authorization server could be created to facilitate this synchronization. If not, then some means of synchronizing is needed once there is an excursion outside the window.

A loss of synchronization should not be cause for disallowing a valid transaction, or passing all fraudulent, out-of-window, transactions. If a transaction was not found in the window and, a certain time has elapsed since the last valid synchronized transaction, then the transaction can be approved while continue searching for the next "n" windows to see whether the approved transaction was a valid transaction. If it was a valid transaction, then the system can resynchronize with the card, and future transactions in the near future should be within the window. These can be approved or declined based on the window only. If it is not a valid transaction, then a fraud alert can be signaled. Any next transactions are watched closely, and declined if an out-of-window condition is repeated.

The elapsed time since last valid transaction threshold can be made small to begin with, e.g., to allow for greater than expected excursions in SeqId synchronization. The number can be adjusted over time as more familiarity and confidence is gained with usage and synchronization patterns appear. The number of out-of-window searches large in the beginning can be made large to assure checks are far enough ahead to assure resynchronization and reduce the number of searches over time with more synchronization history.

Such protects a user who does not use the magnetic stripe on their card for some long period and then starts using it, perhaps repeatedly for some period. An example would be a client making only EMV transactions while at home, and then months or years later traveling abroad and making a series of magnetic swipe transactions.

If synchronization is lost during a long period lacking an opportunity for magnetic stripe synchronization, then a first new transaction will be out of the normal synchronization window. The last valid transaction timer will have expired. The transaction will be approved, and attempts are made to find the transaction by searching other windows. In this case, since it's a valid transaction, it will be found in some subsequent window. At this point, it's resynchronized, and the "last valid transaction timer" is updated so that only in-window validations are allowed until the timer elapses once again.

Such assures that a valid cardholder transactions are approved, even when the units are out-of-synch, assuming the last valid transaction timer has elapsed. That timer can be relaxed initially to very very liberal, and allow much greater excursions that anticipated.

A fraudster that submitted an invalid out-of-window transaction could get away with the first transaction in this scheme, it would be approved and then determined that it was false. But, an alert would be posted immediately, and subsequent transactions disallowed if it was again out-of-window within some time. Such means that a fraudster who skims a card, manipulates the numbers skillfully, scrambles the cryptogram field, reproduces a modified copy with a valid LRC, could effect a single approved transaction. But only if the "last valid transaction timer" had elapsed. The system would detect the fraud after the approval and post an alert for all subsequent transactions. The fraudster would have to be sure that the "last valid transaction timer" had elapsed. Such might be less of an issue at first, with a short timer, but would be much more difficult with this timer being a longer span. In any event, at worst it would still only give a window of a single approved fraudulent transaction, with significant risks for the fraudster.

There is very little incentive for a fraudster to attack such a card. If the fraudster managed to "borrow" the card without raising any concerns, they still wouldn't be able to access the data without the break-in being evident to the cardholder on its return. But if somehow the card internals were accessed without it being evident, it would still be very difficult, if not impossible, to read the cryptogram table. If the table was nevertheless read, only the cryptogram table for that card will be compromised, and not the entire population of cards. Since the cardholder still had possession of the card, there is a limit on how many transactions the fraudster could execute before the cardholder made a purchase and triggered a "replay" alert.

A very high level of security on the card memory is unnecessary. Attacks on the card will necessarily be tamper-evident. So the cardholder will see that the card has been compromised or tampered with and report it. Attacks can only affect a small number of cards because the protected information is unique for only small population. So securing the memory will be much less crucial.

Reading the cryptogram data should be made significantly challenging for any fraudster. But if the card is somehow compromised, and the user if not aware of it, the fraudster would then have a copy of a card to use. If the cardholder is still using their card, these uses will collide at the issuing bank 128 and its network server. The bank can cancel the card and issue another. Such fraud is pretty unlikely, but this strategy provides a further safeguard.

It seems reasonable to use a smaller cryptogram table that perhaps encompasses the majority of cardholders, and add a substitution table for use by high-volume users in order to reduce the table size requirements on the microcontroller. One idea is to use a cryptogram table of about fifty-five, using prime numbers, and a cryptogram substitution table of similar size instead of the large cryptogram table (1000) and smaller cryptogram mask table (3). Such would give a smaller number of unique cryptograms (3×1000=3000, 55×55=3025).

Although such uses less memory space used, it is not nearly as secure from an algorithmic perspective. There is fraud exposure to any technique that reuses the cryptograms. If the fraudster has some idea of the table size, or tries various sizes in a brute force attack,) and has access to a large number of used cryptograms (server/network attack). Then the nature of the digit substitution algorithm can be divined if more than one pass worth of cryptogram have been used.

For example, the size of the crypto table is guessed, and the first pass marked cryptograms are collected. With the next pass through the cryptograms, a table is built to convert Pass-0 cryptograms to Pass-1 cryptograms. The first Pass-0 masked cryptogram was, e.g., in FIG. 11, "506" and the first Pass-1 masked cryptogram was "311". So, it can be determined that first digit 5=>3, the second digit 0=>1, and the third digit 6=>1. Looking at the next two cryptograms (Pass 0/Pass 1), "724"=>"570" allows more digits in the mask conversion table to be filled in. The same for the "398"=>"853" and "977"=>"246", etc. Before long, the entire conversion table can be filled in. Given previous entries, Pass-1 cryptograms that have not yet occurred can be predicted.

If the table size is not known, the correct table size can be determined by building the conversion table without errors. Errors will occur in building the substitution table if the table size guess is too small.

So, in order to limit the chances of success of such an attack, the cryptogram table has to be sufficiently large. It if is larger than the average expected number of swipe transactions, then the table will never repeat, and this particular attack will not be possible. If the table is large enough, attacks will need to collect lots of sensitive data over the course of months or years, before the attack can be used. Even then, the usefulness is limited by how many transactions the fraudster can effect before a high-use cardholder uses their card. This attack is only possible on high-use cards that turn over more than one pass.

However, if the cryptogram table is made small, the exposure becomes much more significant. If the cryptogram table is only about forty entries large, a fraudster could attack the card after a small number of transactions, and a small table greatly increases the exposure of cards to this type of attack.

The ideal crypto table size, from a security aspect, is one large enough to provide unique cryptograms for the maximum number of expected transactions. The ideal crypto table size from a cost perspective is one where unique cryptograms are provided for every transactions for the majority of cardholders. Substitution tables can be used beyond that. If the average cardholder performs 150-200 transactions per year, then a maximum of 400 transactions can be expected over the life of a 2-year card. If the crypto table is more than more than 500 entries long, it would never repeat over the life of the card for the average user, making collecting the data useless in that case. In the case of a high volume user, e.g., 1000 transactions, it would require collecting more than 500-sequential transactions, or some large percentage of these, before the attacking the substitution table would be possible.

With such a table it seems unlikely such an attack would be possible except for the very high-volume users, e.g., a tiny portion of the cardholder base. In such cases, one can simply replace that cardholder's card. A cryptogram table is implemented with entries for a maximum number of allowable transactions, but this would increase the overall cost of the card.

A payment card fraud business model embodiment of the present invention issues users a payment card able to internally generate a new account number on a magnetic stripe each time such is used. The merchant card reader 120 is connected to read the magnetic stripe 206 on the payment card 200, and to report the new account number when a user initiates a merchant transaction. A report from the merchant card reader is analyzed by a issuing bank payment processing server 114 to determine if the new account number is valid or an attempt at fraud. Merchant identification data associated with each the report from the merchant card reader is logged into a database. A decision is made whether to authorize the merchant transaction based on a validity criteria associated with the new account number. The database is inspected for evidence of fraudulent payment card use. Reports can be made for law enforcement efforts in real-time to identify the payment cards and locations of the merchant card readers connected with suspected fraudulent activity. Alternatively, the database can be mined for evidence of fraudulent payment card use, and the payment card 200 can be disabled from being able to initiate any further merchant transactions.

Business model embodiments of the present invention are such that the issuers provide to users a payment card in which the magnetic stripe has material with a low coercivity selected so that any magnetic data recordings internally generated will automatically fade away after a few minutes to obfuscate the new account number. Or, the issuing to users of a payment card is such that the magnetic stripe has material with a coercivity characteristic selected so that any magnetic data recordings internally generated will automatically fade away after a few minutes in order to prevent the new account number being read by a magnetic card reader.

A swipe sensor may be located within the magnetic stripe to trigger an internal writing of a magnetic data. Such can be a resistivity sensor that measures the ohmic contact of a metal read head during card swiping. Such might product few false swipe detections that a pressure sensitive type, especially in situations where the card is placed in a wallet or purse and can be sat on, flexed, or otherwise jostled.

Embodiments of the present invention include a payment card able to internally generate a new account number on a magnetic stripe each time such is used in a merchant magnetic card reader or any payment acceptance device. A payment processing server is used for analyzing a report from the merchant card reader to determine if the new account number is valid or an attempt at fraud. A database of merchant identification data associates each report from the merchant card reader. A program included in the issuing bank 128 and its network server decides whether to authorize the merchant transaction based on a validity criteria associated with the new account number. Any legacy merchant card reader can be used to read the magnetic stripe on the payment card, and to report the new account number when a user initiates a merchant transaction. A device for mining the database for evidence of fraudulent payment card use could be implemented with software. A report data enables real-time law enforcement efforts identify the payment card and locations of the merchant card reader. System embodiments further include means for mining the database for evidence of fraudulent payment card use, and the means for disabling the payment card from being able to initiate any further merchant transactions.

Preferably, payment card embodiments of the present invention are such that the magnetic stripe has material with a low coercitivity selected so that any magnetic data recordings internally generated will automatically fade away after a few minutes to obfuscate the new account number.

The first digit in a 16-digit personal account number (PAN) on a typical credit card is called a major industry identifier, with "1" for Airlines, "3" for Travel and entertainment and "4" or "5" for Banking and financial categories. For example, a card number starting with "4" is a Visa card, a card starting with "51", "52", "53", "54"or "55" is a MasterCard and a card starting with "34" or "37" is an American Express Card. The first six digits including the major industry identifier represent the issuer identifier. This allows 9-digits and one LUHM-check digit to be manipulated to identify a user and a virtual account number assignment in the case of a 16-digit PAN. The expiration date can add a bit more information to validate the card, but not as much as four unconstrained digits would. The expiration date, after all, represents a date. Such also must be in the future at card issuance. So the range of the first two digits (M1, M2) is 01-12 for January through December. The last two digits (Y1, Y2) typically can only represent a 5-year range, for 2004 the possible numbers would range only 04-09.

The expiration date can be used to discriminate 1.1% of a user population. For 75-million CitiBank MasterCards, 1.1% is 82,000. Five significant digits in the PAN must be devoted to discriminate amongst 75-million users, because 80,000 would share the same expiration date. Any remaining digits can be used to implement virtual account numbers for one-time transaction use.

So in this example, not counting the LUHM-check digit, there are ten digits are available in the PAN, but five of those digits are needed for user discrimination. Such yields an order of magnitude more security than the 4-digit "PIN level" in common use, and so should be acceptable to most banks.

The security can be improved by adding more orders of magnitude, e.g., by extending the card validity period beyond the typical three years. The bank identifier can be shortened to free up a digit, and the PAN field could be expanded to the full 19-digits allowed by International Standards Organization (ISO) industry-standards. But such would require changes to the MasterCard assignment tables and may be difficult. The extension of the validity period is easily done within the bank.

The assignment of PAN, expiration date, CVC, and other bank personalization process numbers for each new, expired, or renewed account can be optimized to allow accurate distribution of accounts across a full 36-48 month period.

In an alternative embodiment, the CVC can be used for off-line analysis and yield nine digits or orders of magnitude security. But such may not be useful for card-not-present transactions because merchants do not always demand the CVC.

A card must include a display for card-not-present purchases, but such is not necessary for card-present purchases. Card-not-present refers to internet or phone purchases known as "card not present" transactions. Card-present refers to merchant machine purchases, "point of sale", or "card acceptance systems", Automatic Teller Machines or Kiosk systems, etc.

The PAN may have as few as three, or as many as five, bank identifier digits, as mentioned above. The fewer the better, in the examples, though account base variance by an order of magnitude has equal affect.

Magnetic data is arranged serially in a sequence of thirty-seven numeric data characters, with several more start, end, and data integrity check characters used as field separators. This is the data read by the merchant point of sale terminal. The POS terminal strips away the SS, FS, ES, and LRC characters and forwards the PAN, additional data, and discretionary data to the merchant acquirer 110, through the transaction network 100, and on to the issuing card bank 128. Table-II illustrates the usual placement of these data fields on a typical credit card magnetic stripe.

TABLE II

| <37 numeric characters> | | | | | | |
|---|---|---|---|---|---|---|
| SS | PAN | FS | Additional Data | Discretionary Data | ES | LRC |

| | Description |
|---|---|
| SS | one character Start Sentinel, to indicate start of data sequence |
| PAN | 19 character account number field (maximum), includes one digit card type, up to five digits bank indentifier, up to 12-digit account number and one check digit (Luhn checksum) |
| FS | one character Field Sentinel to separate data fields |
| Additional Data | seven characters for expiration date, service code, etc. |
| Discretionary Data | eight characters for CVC/CVV/PVV data |
| ES | one character End Sentinel to identify end of data string |
| LRC | one character check digit to confirm magnetic data intergrity |

A typical CitiBank MasterCard card data is diagrammed in Table-III. Each transaction changes the data, and affects the probability of guessing the next number in sequence.

TABLE III

| <37 numeric characters> | | | | | | |
|---|---|---|---|---|---|---|
| SS | 5466 1600 5267 1983 | FS | 0503 149 | 99999999 | ES | 9 15 |

In this example, the first two digits identify this card as a MasterCard (54), and the whole CitiBank BIN number is identified by the first six digits (546616). The user's account number is 005267198, with a check digit of "3". This number can be fixed to be able to identify the user's account by some number, whether such is the Discretionary Data field, or the PAN field.

The expiration date is preferably fixed and does not change so the transaction network can qualify prior to bank authorization, and prevent unnecessary network loading.

A "service code" number can be changed according to a bank's requirements. This service code can be used to identify the card to the transaction network as a "special" card. The discretionary data field is defined by the bank and consists of 8-9 characters. This field allows for 99,999,999, or 999,999,999, possible combinations of numbers. Such implies one in 100-million, or one in one-billion chance of guessing the next valid number. However, the type of cryptography used will determine the actual statistical odds of guessing the next number.

In general, QChip magnetic transducer array embodiments of the present invention are used to create numerous magnetic transitions in a longitudinal magnetic recording medium. The magnetic storage medium is compatible with the read-bank signal requirements of standard legacy readers for magnetic stripe credit cards. Legacy readers exploit Faraday's law of electromagnetic induction by having a coil wound on a magnetic core that includes a non-magnetic gap. The recording medium is scanned past the reader gap to produce a read-back signal proportional to the rate of change in magnetic flux with time. The signal is typically 1-3 mV per inch/sec of card speed past the reader head.

In usual practice, magnetic data is written on magnetic stripes by moving the card past a magnetic writing head. Such receives a writing current whose polarity is switched when clocking and data transitions are required. The QChip magnetic device requires no motion relative to the recording medium. The writing transducer array and medium are static, small, and thin. They are packaged within a standard credit card and replace a selected portion of the original standard recording medium of that card. The writing array is connected to a battery-powered microprocessor/logical network that drives and sequences each of the numerous writing transducers to produce new encrypted data bit patterns along a magnetic track in the recording medium overlaying the static array.

The writing field is strong enough, given certain magnetic media materials, to erase old data and create new information in a selected region of the recording track. The energy used by the microprocessor, logic network, and writing array enables a useful life, e.g., 1000-2000 write/read cycles, assuming an internal battery of 2-3 volts with about 10-30 mA-hours of charge.

Information in a digital magnetic recording medium is stored as polarity reversals, or transitions, in the direction of the remanent magnetic flux of the recorded medium. The relevant magnetic properties of the storage medium are the coercivity ($H_c$ in Oersteds), remanence ($M_x$ in emu/cm$^3$), magnetic thickness (t in cm), and coercive squareness (S*, a dimensionless number). Low coercivity media can be written with low-level writing currents, but such is easily erased and/or demagnetized. High coercivity media needs very high writing currents to write the bits, but once written the magnetic bits are not easily erased or demagnetized.

Embodiments of the present invention target a coercivity Hc in the range of 50-400 Oersteds (Oe). The middle of the range is favored in order to conserve battery energy (to extend the operational lifetime of the Q-card device) while still providing adequate signal amplitude (in keeping with current recording standards). The coercive squareness S* is a measure of the range ($\Delta H$) of recording fields over which the medium switches (S*=1−$\Delta H$/Hc). So such is preferable that $\Delta H$ be small, and S* be close to 1.0. The target is 0.7<S*<1.0.

The read-back signals scale with the remanence-thickness product of the medium, $M_{rt}$ (in emu/cm$^2$). Typical low coercivity media support the ISO/IEC 7811 specification for signal amplitude. These media have $M_{rt}$ in the range of 30-100 milli-emu/cm$^2$ (or memu/cm$^2$). About 80 memu/cm$^2$ should be compatible with the majority of legacy card readers.

Good choices for media in this application include sputtered or electro-plated iron, sputtered cobalt, or alloys of these materials. CoFe is especially suitable in terms of magnetization and controllability. The $H_O$ can be adjusted by varying the alloy composition and fabrication conditions. The $M_O$ can likewise be varied over a wide range by controlling the composition. The magnetic medium should be about 0.1-10 µm in thickness.

The magnetic medium can be an alloy of sputtered FeCo (30%-80% Co in Fe), with $M_r$ in the range of 1500-1900 emu/cm$^3$ at a film thickness t of 0.50 micron to 0.67 micron. A variety of recording media exist (oxides of Fe, Ba, or Cr) with $M_O$ on the order of 100 emu/cm$^3$, so the films would be quite thick (t on the order of 10 microns) to meet signal requirements, and Hc is in the range of 300 Oe up to 2400 Oe. Writing fields for these media would be higher than the suitable range needed for the QChip.

QChip devices use pulsed electric current flowing in solenoid coils. These are wound around a magnetic core. The pulses magnetize the core, e.g., North-South or South-North polarity depending on the current direction. The external magnetic field of the core magnetizes the recording medium which retains the polarity of the magnetic field after such is turned off. After each transaction is written, a microprocessor addresses a logical network to scan to the next coil in the writing sequence. Such electrical scanning process is repeated until all of the required transitions are written and stored in the recording medium. Through this sequential scanning process with a brief current pulse flowing through an individual coil, the maximum current drain on the battery is limited to very low values, so small batteries can be used.

The recording medium is a top layer, and may be protected with a protective overcoat of a hard material, such as diamond-like carbon (DLC), or silicon nitride or silicon oxide. The recording medium may be deposited on an under layer of a non-magnetic material, e.g., Cr or Ta, to assist with adhesion and crystallographic orientation.

Credit card data encoding is a double-frequency self-clocking scheme, 2 f (FM). There are two magnetic bits for each data bit cell. An all-ones series (11111) is encoded as 1111111111. An all-zeroes pattern (00000) is recorded as 10101010101. With a 40-bit design, there are eighty magnetic coil elements, each of a length L. At recording densities of 75, 150, or 210 bits per inch, for example, L=170, 85, or 60.5 microns, and the length of the entire array would be 13.6, 6.8, or 4.8 mm, respectively. At any chosen density, the coil must be designed on the available voltage/current. The energy typically residing in an on-board battery is 10-30 maH at 2-3.3 volts, in some cases local dc-dc converters/charge-pumps can create the necessary programming current pulses. The coil design requires careful attention to the circuit resistance and inductance. The required magnetic field, and how much current is needed to generate this field dictate both the coil parameters and energy requirements.

The writing field ($H_w$) is set by the coercivity (Hc) of the recording medium. In normal practice Bw is roughly 2-3 times Hc. To keep the writing current compatible with a single battery voltage of 2-3 volts, a target of 50-100 Oersteds (Oe) is used for $H_O$, so Hw=100 to 300 Oe (8 kA/m to 24 kA/m0.

The writing current is roughly estimated with Ampere's Law $H=\eta NI/L$, where $\eta$ is the writing efficiency (about 0.50), N is the number of coil turns, I is the current (in Amps), and L is the coil length (in meters). For the given range (8-24 kA/m) of medium coercivity, the required current would be $I=HL/(\eta N)=(1.36-4/08)/N$ Amps, or 272-816 mA for N=5 turns, a writing efficiency $\eta=0.50$, and a coil length L=85 microns (150 bpi). With a battery of 2-Volts, the resistance (R=V/I) of a coil must be in the range of 2.45-7.35 ohms to support the required current.

So, a business model embodiment of the present invention provides for reducing credit card fraud, and includes cryptographically generating a series of unique values from user account access numbers and storing them as sets in corresponding private crypto-tables in a plurality of credit cards. The plurality of credit cards are deployed in the retail community such that each can modify its own magnetic stripe with values obtained from the private crypto-tables to result in a complete magnetically recorded transaction number that can only be authorized by a payment server once. A fraud detection program is installed on the payment server that can compute from the user account access numbers a next set of unique values that would have been validly stored in each of the crypto-tables. A business can be made of selling to subscribers a report service connected to the fraud detection program that is able to detect and announce the merchant location of a skimming event and attempt at fraud.

Figure 8:
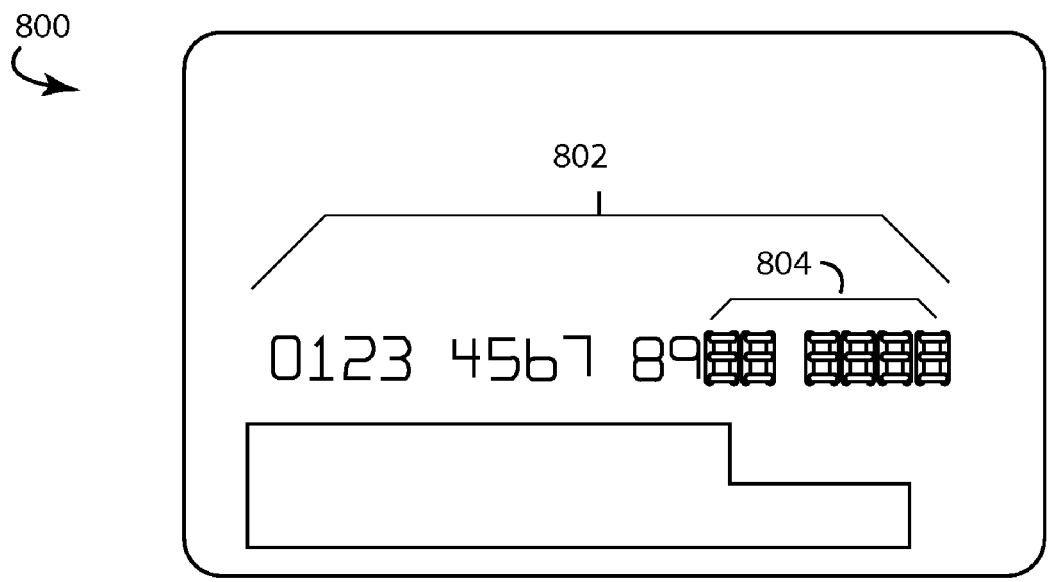
FIGS. 8-10 illustrate payment cards in which only a portion of a personal account number (PAN) has been implemented to be variable on a virtual display.
Figure 9:
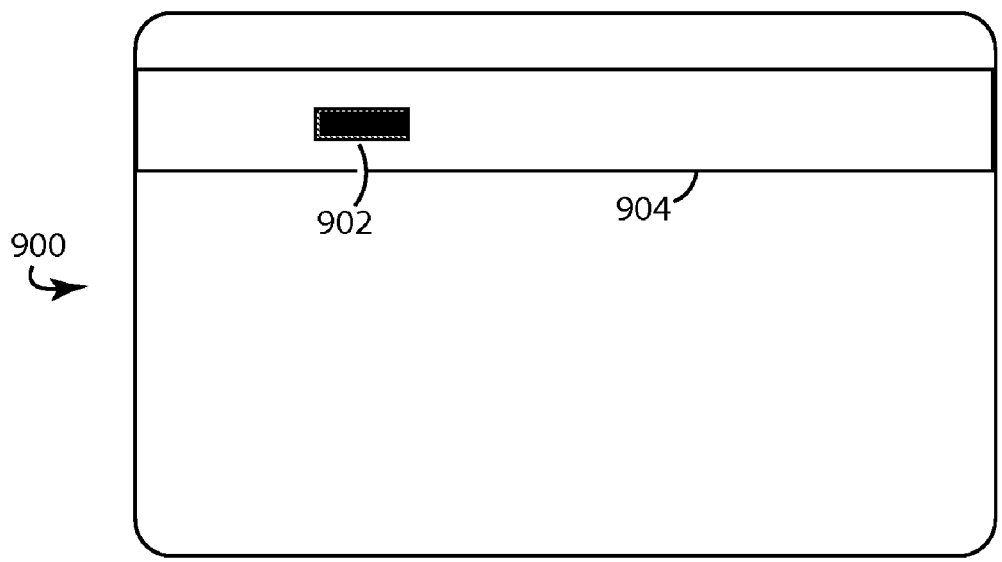
Figure 10:
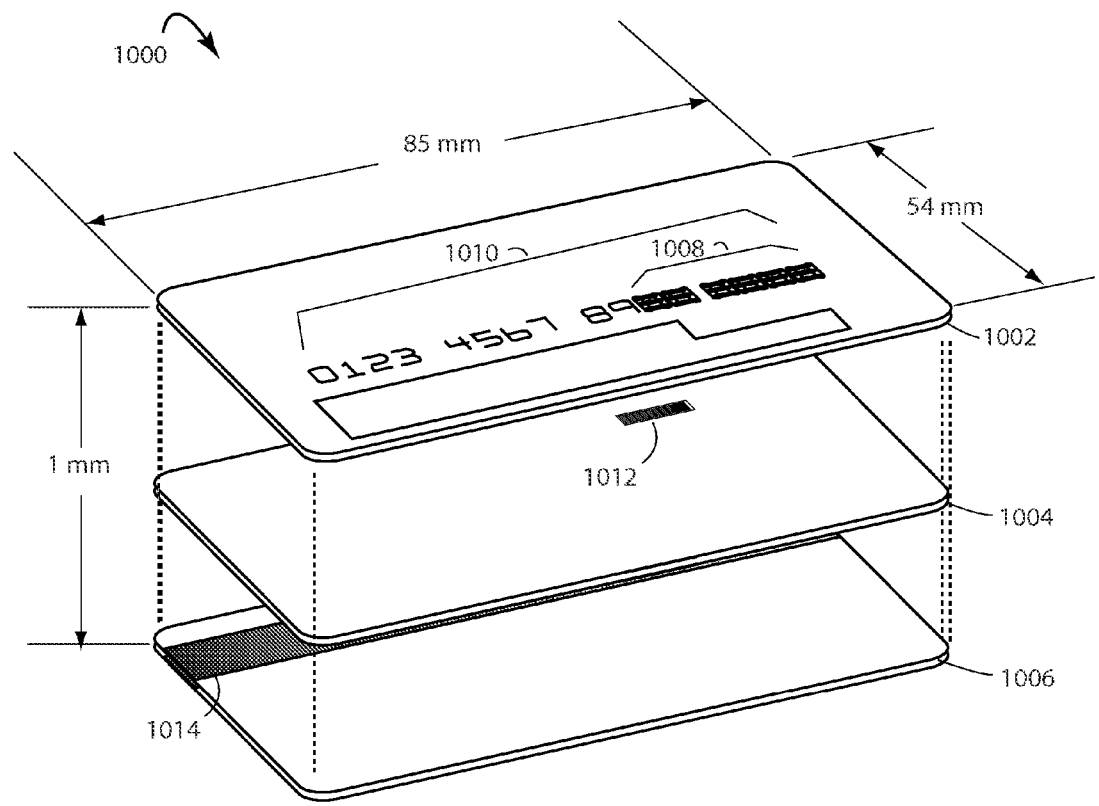

FIGS. 8-10 illustrate payment cards in which only a portion of a personal account number (PAN) hasa been implemented to be variable on a visual display. In FIG. 8, a payment card 800 includes a PAN 802 with a digital display 804 for card-not-present transactions. FIG. 9 shows a backside of a payment card 900, like card 800, and with a magnetic MEMS device 902 in a magnetic stripe 904 for card-present transactions. FIG. 10 shows how all these come together in one card 1000 that is built from laminated and fused layers 1002, 1004, and 1006. A variable portion 1008 of a PAN 1010 provides for card-not-present transactions, while a QChip 1012 embedded in a magnetic stripe 1014 provides for card-present transactions. Typical dimensions for the complete card 1000 are 85 mm×54 mm×1 mm.

Figure 11:
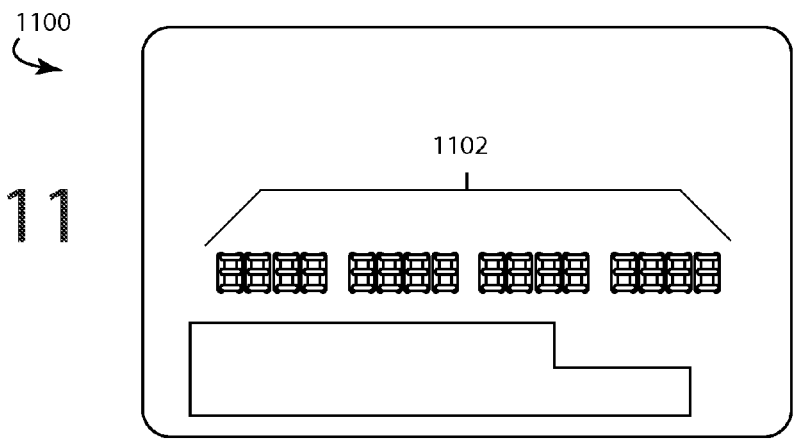
FIGS. 11-12 illustrate payment cards in which the whole of a personal account number (PAN) has been implemented to be variable on a visual display.
Figure 12:
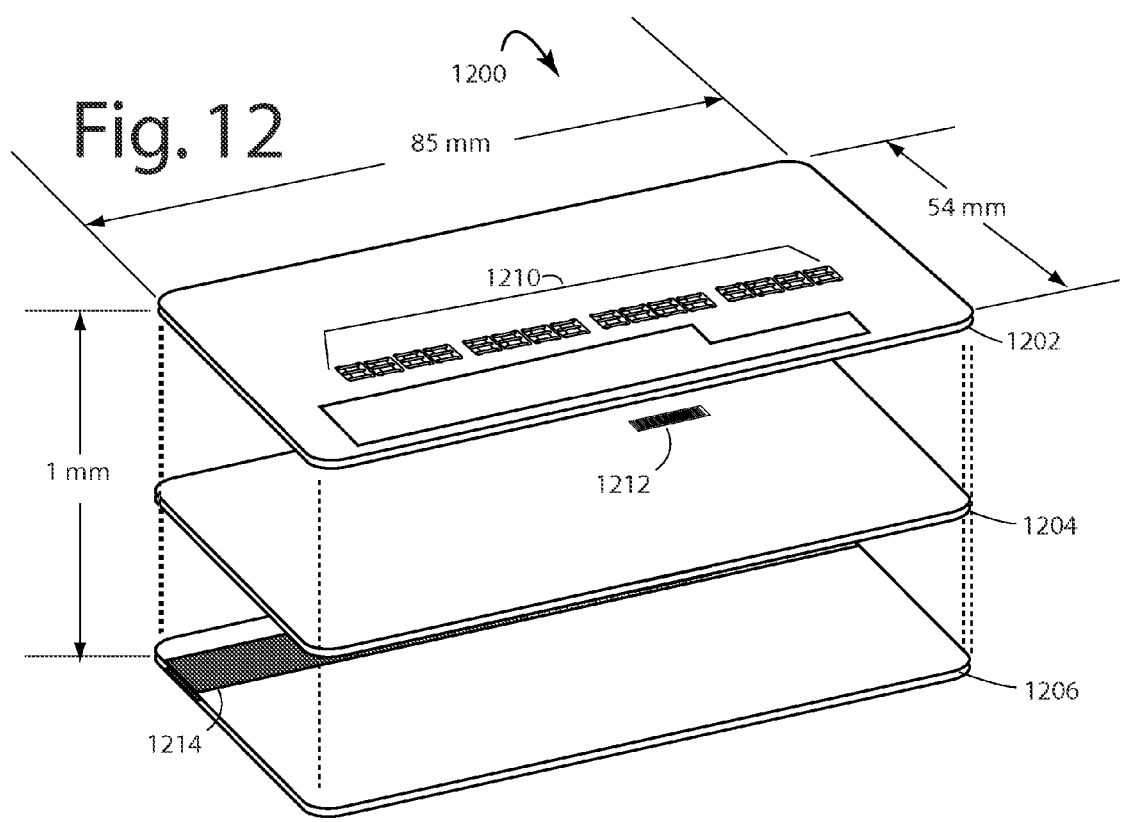

FIGS. 11 and 12 illustrate payment cards in which the full personal account number (PAN) has been implemented to be variable on a visual display. In FIG. 11, a payment card 1100 includes a PAN with a digital display 1102 for card-not-present transactions. FIG. 12 shows how all pieces can come together in one card 1200 that is built from laminated and fused layers 1202, 1204, and 1206. Typical dimensions for the complete card 1200 are 85 mm×54 mm×1 mm. A PAN 1210 provides for card-not-present transactions, while a QChip 1212 embedded in a magnetic stripe 1214 provides for card-present transactions.

Although particular embodiments of the present invention have been described and illustrated, such is not intended to limit the invention. Modifications and changes will no doubt become apparent to those skilled in the art, and such is intended that the invention only be limited by the scope of the appended claims.

The invention claimed is:

1. A system for securing financial transactions with payment cards in card-not-present financial transactions with merchants in which a payment card is not accessible to a merchant terminal, comprising:

a payment card for use in card-not-present financial transactions with a merchant, and which does not depend on receiving data from said merchant in card-not-present financial transactions;

a personal account number (PAN) disposed on the surface of the payment card and visibly readable by a user, and including a dynamic part in which the digits presented can vary, and a static part in which the digits do not change;

a crypto-table of individual table-values externally preprogrammed into the payment card and dependent on personalization information;

a user display disposed on the payment card in said dynamic part of the PAN, and providing an electronic visual output for a selected table-value from said crypto-table;

an electronic trigger to select a next table-value from said crypto-table for the user display;

a timer connected to the electronic trigger, and providing a limit on the frequency at which said new next table-value from said crypto-table can be retrieved; and a payment infrastructure connected through said merchant and providing for financial transaction authorizations based at least on the validity of said dynamic and static parts of the PAN, for generating and preprogramming crypto-table and table-values into the payment card according to a cryptogram generation process that is not included in the payment card.

2. The system of claim 1, wherein:

the PAN is a set of use-once sixteen-digit personal account numbers linked with a particular payment card, wherein are included fields for a system number, a bank/product number, a user account number, and a check dig it, and each account number includes a variable part that must match an expected variation to be accepted in financial transactions by the payment infrastructure.

3. The system of claim 1, further comprising:

a four-digit expiration date (MMYY) linked with the PAN and included to discriminate amongst a user population.

4. The system of claim 1, further comprising:

a magnetic stripe disposed on said payment card and encoded with the PAN, and providing for periodic reading by a magnetic card reader during a card-present financial transaction with a merchant.

5. The system of claim 1, further comprising:

a cryptogram generation process for reserving only to an issuing bank, and that includes table generation keys or algorithm details that are not shared externally, and that can send personalization information a secure message that includes at least one of corresponding users' names, addresses, account numbers, expiration dates.

6. The system of claim 1, further comprising:

a swipe sensor for detecting that the payment card has been swiped in a card reader and for signaling that a financial transaction is being commenced with the payment card in a card-present transaction with a merchant.

7. The system of claim 1, wherein:

the crypto-table of individual table-values includes means for not repeating the use of any of said individual table-values in another financial transaction after being used once.

8. A construction and operation method for securing payment card financial transactions in a secure financial transaction network and payment infrastructure, comprising:

associating a personal account number (PAN) with a particular payment card and user by embossing and magnetically recording on said payment card fields for a system number, a bank/product number, a user account number, and a check digit;

associating an expiration date with said PAN by embossing and magnetically recording on said payment card;

encoding a magnetic stripe disposed on said payment card with a magnetic data recording to represent said PAN for periodic electronic reading by a magnetic card reader during a card-present financial transaction with a merchant terminal;

electronically storing data for a table of cryptographic values associated with said PAN on each user's payment card during personalization;

electronically sensing a financial transaction being commenced with the payment card with the use of a swipe sensor;

separating in time a current financial transaction with a merchant terminal from a next, new financial transaction, with an electronic timer disposed in said payment card, and triggered by a user input;

electronically presenting a current variable part of said PAN on the user display only during a current financial transaction with said merchant terminal;

electronically presenting a new, next variable part of said PAN on said user display only during a next, new financial transaction with any merchant terminal;

imposing an electronic limit on how frequently a new, next variable part of said PAN can be electronically generated and presented on said user display;

data selecting a cryptographic value from a table of cryptographic values for inclusion as a dynamic portion of said PAN when a next, new financial transaction is electronically sensed with any merchant terminal;

not repeating the use of any cryptographic data value from said table of cryptographic values in another financial transaction with any merchant terminal after being used once; and authorizing with an electronic data message said next financial transaction only if said PAN electronically read by any merchant terminal includes a correct cryptographic value in said user account number field.

9. The method of claim 8, further comprising:
limiting the range of said four-digit expiration date (MMYY) to a range of forty-eight months and evenly allocating expiration months in the range to discriminate amongst a population of users during validation, such that said PAN and said MMYY combine to provide a greater number of unique identifiers for such users.

10. A secure financial transaction network for payment cards, comprising:
a personal account number (PAN) with an included set of variations in a predictable sequence for linking with a particular payment card and user, wherein are included fields for a system number, a bank/product number, a user account number, and a check digit;

static and dynamic magnetic recording devices for encoding a magnetic stripe on said payment card with said PAN and its variations in use-once sequence for periodic reading by a magnetic card reader during a financial transaction, wherein said PAN does not necessarily match another PAN that may be presented on a user display disposed on the same payment card;

a secure message of personalization information to enable programming of a table of cryptographic values constituting sequenced predictable variations in said PAN on each user's payment card;

a card-present trigger for sensing a next financial transaction being commenced with said payment card;

a device for selecting a cryptographic value from said table of cryptographic values for inclusion as a dynamic portion of said user account number in said PAN when a next financial transaction is sensed;

a device for not repeating the use of any cryptographic value from said table of cryptographic values in another financial transaction after its being used once; and a transaction authorized message for authorizing by said issuing bank said next financial transaction only if said PAN matches an expected variation defined originally in said secure message of personalization information for said table of cryptographic values.

11. The network of claim 10, further comprising:
a four-digit expiration date (MMYY) limited to a range of forty-eight months and evenly allocating expiration months in the range to a population of users, such that said PAN and said MMYY combine to discriminate amongst such users.

12. A secure payment card, comprising:
a payment card for use in card-present and card-not-present financial transactions with merchants;

a set of personal account numbers (PAN's) that are predictable and sequentially issued visually or magnetically by the payment card, wherein are included data fields for a system number, a bank/product number, a user account number, and a check digit;

a magnetic stripe disposed on the payment and providing static and dynamic magnetic data representing a selected one from the set of PAN's for periodic reading one-way access by a magnetic card reader during a card-present financial transaction;

a precomputed and preprogrammed table of cryptographic values for constructing individual ones of the set of PAN's on the payment card when triggered by a use;

a detector for sensing a next, new financial transaction being commenced with the payment card and providing a trigger to issue a new PAN;

a cryptographic value selectable from the table of cryptographic values for inclusion as a dynamic portion of said user account number with said each PAN when a next financial transaction is sensed.

13. the payment card of claim 12, further comprising:
a display device and switch embedded in the payment card for supporting secure card-not-present transactions by making the set of PAN's visually readable by a user once, and only one at a time.

* * * * *